US012630147B2

(12) United States Patent
Maeda et al.

(10) Patent No.: US 12,630,147 B2
(45) Date of Patent: May 19, 2026

(54) VEHICLE CONTROL DEVICE AND VEHICLE CONTROL METHOD

(71) Applicant: Hitachi Astemo, Ltd., Hitachinaka (JP)

(72) Inventors: Kenta Maeda, Tokyo (JP); Takahiro Ito, Tokyo (JP); Kentarou Ueno, Hitachinaka (JP); Shuji Ohshita, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/841,298

(22) PCT Filed: Oct. 12, 2022

(86) PCT No.: PCT/JP2022/038014
§ 371 (c)(1),
(2) Date: Aug. 23, 2024

(87) PCT Pub. No.: WO2023/166777
PCT Pub. Date: Sep. 7, 2023

(65) Prior Publication Data
US 2025/0162572 A1 May 22, 2025

(30) Foreign Application Priority Data

Mar. 4, 2022 (JP) ................................. 2022-033175

(51) Int. Cl.
*B60W 30/02* (2012.01)
*B60W 40/08* (2012.01)
(Continued)

(52) U.S. Cl.
CPC .......... *B60W 30/025* (2013.01); *B60W 40/08* (2013.01); *B60W 50/0097* (2013.01);
(Continued)

(58) Field of Classification Search
CPC ............... B60W 30/025; B60W 40/08; B60W 50/0097; B60W 50/14; B60W 2050/146;
(Continued)

(56) References Cited

U.S. PATENT DOCUMENTS

2017/0032201 A1* 2/2017 Bieg ..................... B60W 40/08

FOREIGN PATENT DOCUMENTS

JP 2005-326962 A 11/2005
JP 2017-193189 A 10/2017
(Continued)

OTHER PUBLICATIONS

International Search Report Issued in PCT Application No. PCT/JP2022/038014 dated Dec. 27, 2022, with English Translation.
(Continued)

*Primary Examiner* — Sizo B Vilakazi
(74) *Attorney, Agent, or Firm* — Foley & Lardner LLP

(57) ABSTRACT

To provide a vehicle control device and a vehicle control method that take into consideration individual differences and the effect of vehicle motion, not only in the horizontal direction but also in the front-rear direction, on the head movement of a passenger, and further reduce the head movement of the passenger through vehicle motion that coordinates the front-rear and horizontal directions. The vehicle control device includes: a head movement prediction model that finds, relative to the head movement of a passenger in a first direction caused by vehicle motion in the first direction, the change in the head movement of the passenger in the first direction caused by the vehicle motion in a second direction different from the first direction; and a vehicle motion generation unit that generates the vehicle motion on the basis of the head movement prediction model.

11 Claims, 23 Drawing Sheets

(51) Int. Cl.
*B60W 50/00* (2006.01)
*B60W 50/14* (2020.01)
*G06V 20/59* (2022.01)
*G06V 40/10* (2022.01)

(52) U.S. Cl.
CPC ............. *B60W 50/14* (2013.01); *G06V 20/59*
(2022.01); *G06V 40/10* (2022.01); *B60W*
*2050/146* (2013.01); *B60W 2420/403*
(2013.01); *B60W 2520/16* (2013.01); *B60W*
*2520/18* (2013.01); *B60W 2540/223* (2020.02)

(58) Field of Classification Search
CPC ....... B60W 2420/403; B60W 2520/16; B60W
2520/18; B60W 2540/223; B60W
2720/16; B60W 2720/18; G06V 20/59;
G06V 40/10
See application file for complete search history.

(56) References Cited

FOREIGN PATENT DOCUMENTS

| | | | | | |
|---|---|---|---|---|---|
| JP | 2019119342 A | * | 7/2019 | ............ | B60W 40/08 |
| JP | 2021-062821 A | | 4/2021 | | |
| WO | WO-2017183486 A1 | * | 10/2017 | .............. | B62D 6/00 |

OTHER PUBLICATIONS

Extended European Search Report issued in European Application
No. 22929921.9 dated Jan. 21, 2026 (10 Pages).

* cited by examiner

SUBJECT A

SUBJECT B

SUBJECT C

FIG. 13

VEHICLE CONTROL DEVICE AND VEHICLE CONTROL METHOD

TECHNICAL FIELD

The present invention relates to a vehicle control device and a vehicle control method that control the motion amount of a vehicle. More specifically, the present invention relates to a vehicle control device and a vehicle control method that control the posture of a vehicle so as to improve the ride comfort of a passenger and to prevent carsickness (motion sickness) from being caused.

BACKGROUND ART

As a conventional vehicle control device that controls vehicle motion for reducing the movement of the head of a passenger leading to carsickness (motion sickness) for the passenger, for example, one described in Patent Literature 1 is known.

The abstract of Patent Literature 1 describes: "included are deviation angle detection means that detects a deviation angle between the advancing direction of a vehicle and the direction of a target reach point after a forward gaze time on a target course in which the vehicle travels, target value calculation means that calculates a yaw angle speed proportional to the detected deviation angle, as a first target value of the yaw angle speed after a dead time that is one third of the forward gaze time, target value correction means that corrects the first target value of the yaw angle speed to find a second target value of the yaw angle speed in the case of performing feed forward control for suppressing the head movement of a passenger, and vehicle motion control means that controls vehicle motion so as to achieve the second target value of the yaw angle speed after the dead time. The dead time is a first dead time corresponding to the phase delay of the feed forward control, or the sum of the first dead time and a second dead time corresponding to the phase delay of a transfer function from an actual steering angle to the yaw angle speed".

In addition, the claim 2 of Patent Literature 1 describes: "the transfer function of the feed forward control is a second transfer function including an inverse model in which the sign of an unstable zero point present in the numerator of a first transfer function that acquires the head displacement of the passenger from lateral acceleration acting on the vehicle defined by using a human body behavior model is inverted to replace the numerator and the denominator".

CITATION LIST

Patent Literature

Patent Literature 1: Japanese Unexamined Patent Application Publication No. 2021-62821

SUMMARY OF INVENTION

Technical Problem

However, the vehicle motion control method of Patent Literature 1 mentions only the control in the horizontal (roll) direction of the head of the passenger, and it is considered that there is a case where, in order to further suppress the head movement of the passenger, the speed during curve passing is required to be lowered.

In addition, Patent Literature 1 does not mention that the human body behavior model can be different according to passenger, and there is a possibility that the feed forward control adapted to a certain passenger does not exhibit the head movement suppression effect much to a different passenger. To reduce the motion sickness of the passenger more effectively without deteriorating the convenience of improving the curve passing speed, that is, shortening the time to reach the target place, not only the horizontal (roll) direction, but also the front-rear (pitch) direction, is required to be taken into consideration and to perform the model adaption that corresponds to individual differences.

Accordingly, an object of the present invention is to provide a vehicle control device and a vehicle control method that take into consideration individual differences and the effect of vehicle motion, not only in the horizontal (roll) direction but also in the front-rear (pitch) direction, on the head movement of a passenger, and further reduce the head movement of the passenger through vehicle motion that coordinates the front-rear and horizontal directions.

Solution to Problem

According to the above, in the present invention, "a vehicle control device includes: a head movement prediction model that finds, relative to the head movement of a passenger in a first direction caused by vehicle motion in the first direction, the change in the head movement of the passenger in the first direction caused by the vehicle motion in a second direction different from the first direction; and a vehicle motion generation unit that generates the vehicle motion on the basis of the head movement prediction model."

Further, in the present invention, "a vehicle control method includes controlling a vehicle such that relative to the head movement of a passenger in a first direction caused by vehicle motion in the first direction, the change in the head movement of the passenger in the first direction caused by the vehicle motion in a second direction different from the first direction is found, to suppress the vehicle motion in the second direction.

Further, in the present invention, "a vehicle control method includes controlling a vehicle such that relative to the head movement of a passenger in a left-right direction caused by vehicle motion in the left-right direction, the change in the head movement of the passenger in the left-right direction caused by the vehicle motion in a front-rear direction is found, to suppress the vehicle motion in the front-rear direction."

Advantageous Effects of Invention

According to the present invention, it is possible to achieve the vehicle control method by which with respect to more passengers, the head movement is effectively reduced to suppress the motion sickness without deteriorating the convenience of improving the curve passing speed, that is, shortening the time to reach the target place.

This makes it possible to improve the ride comfort of the passenger and to suppress the carsickness (motion sickness) from being caused.

Objects, configurations, and effects other than the above will be apparent from the description of the following embodiments.

BRIEF DESCRIPTION OF DRAWINGS

FIG. 13 is a diagram illustrating a specific configuration example of the vehicle motion generation unit 25;

DESCRIPTION OF EMBODIMENTS

Figure 1:
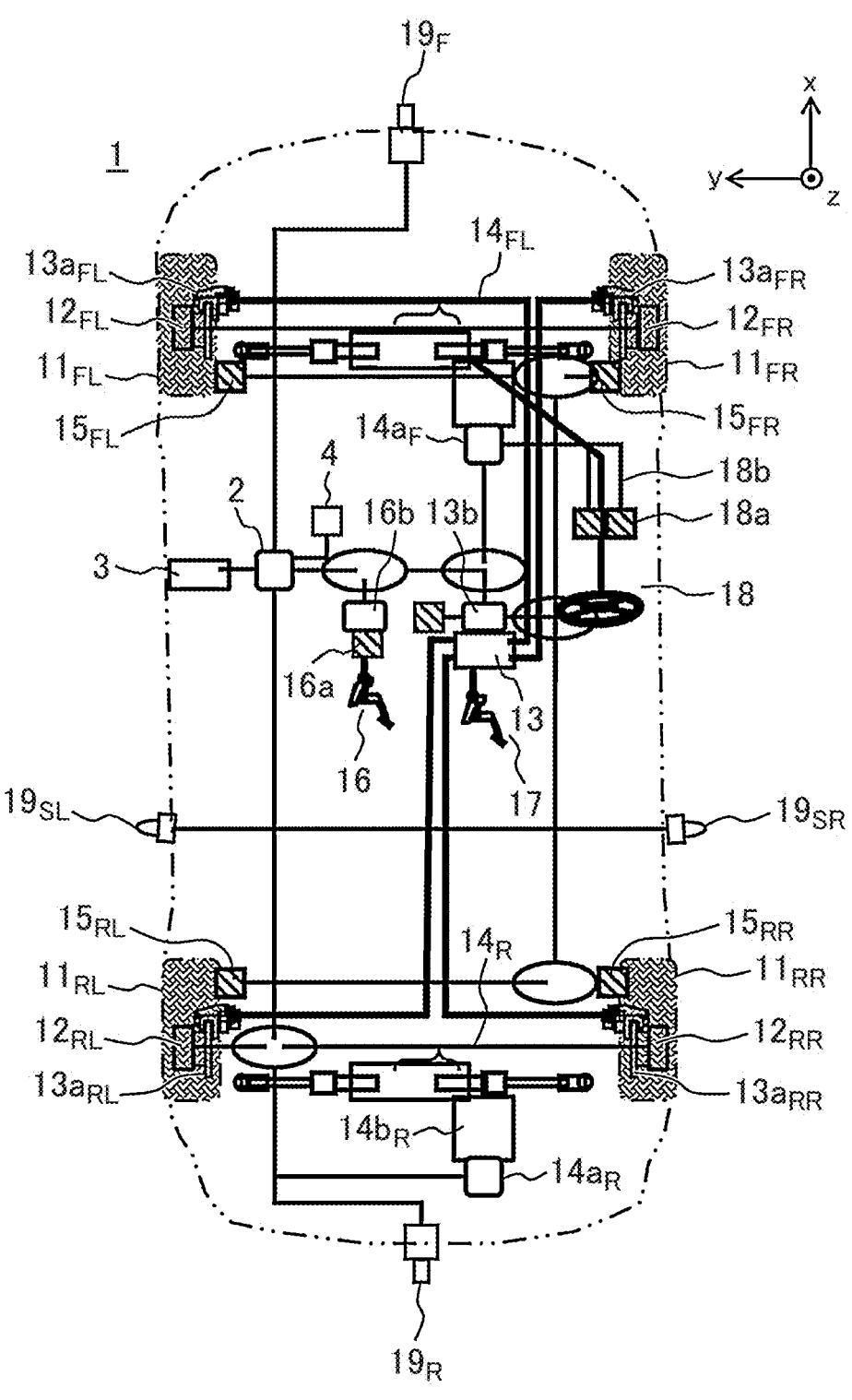
FIG. 1 is a plan view illustrating an overall configuration example of a vehicle 1 according to a first embodiment of the present invention.

One embodiment of the invention will now be described with reference to the drawings. It should be noted that in each drawing, the same components are indicated by the same reference numerals, and the repeated description thereof may be omitted.

Here, the basic idea of the present invention will be apparent, and in the conventional art, motion sickness due to a head movement in the left-right direction is reduced by suppressively controlling the motion amount in the left-right direction, whereas in the present invention, this is performed on the basis of the finding of a new finding in which a head movement in the front-rear direction also has an effect on the motion sickness due to the head movement in the left-right direction.

More specifically, the above finding according to the present invention is that "relative to the head movement of a passenger in a first direction caused by vehicle motion in the first direction, vehicle motion in a second direction different from the first direction has an effect on the head movement of the passenger in the first direction".

From this, in the present invention, to reduce the motion sickness due to the head movement in the left-right direction, the head movement in the front-rear direction is suppressively controlled, and a specific method thereof will be described according to embodiments.

First Embodiment

A vehicle control device according to a first embodiment of the present invention will be described with reference to FIGS. 1 to 18.

FIG. 1 is a plan view illustrating an overall configuration example of a vehicle 1 according to the embodiment of the present invention. In FIG. 1, the reference numeral 2 denotes a vehicle control device, the reference numeral 3 denotes an outside control device, the reference numeral 4 denotes a combine sensor, the reference numeral 11 denotes a wheel, the reference numeral 12 denotes a motor, the reference numeral 13 denotes a brake mechanism, the reference numeral 14 denotes a steering mechanism, the reference numeral 15 denotes a suspension, the reference numeral 16 denotes an accelerator pedal, the reference numeral 17 denotes a brake pedal, and the reference numeral 18 denotes a steering wheel.

Note that in the drawing, the FL, the FR, the RL, and the RR are the reference numerals corresponding to the left front, the right front, the left rear, and the right rear, respectively, and by taking the wheel 11 as an example, $11_{FL}$, $11_{FR}$, $11_{RL}$, and $11_{RR}$ denote a left front wheel, a right front wheel, a left rear wheel, and a right rear wheel, respectively. In addition, the F and the R are the reference numerals corresponding to the front side and the rear side, respectively.

Hereinbelow, the front-rear direction of the vehicle 1 is defined as the x axis (the front direction is positive), the left-right direction is defined as the y axis (the left direction is positive), and the up-down direction is defined as the z axis (the up direction is positive), and then, the details of the respective configurations will be sequentially described.

The vehicle control device 2 is a control device that integrally controls the respective actuators, such as the motor 12, the brake mechanism 13, the steering mechanism 14, and the suspension 15, according to the operation of a driver, an outside instruction from the outside control device 3, and the detection signals (the detection signals regarding the control axes having a total of 6 degrees of freedom of the respective front-rear, left-right, and up-down accelerations and the respective roll, pitch, and yaw rates) of the combine sensor 4.

Specifically, the vehicle control device 2 is an ECU (Electronic Control Unit) including hardware, such as a calculation device such as a CPU (Central Processing Unit), a main memory device and an auxiliary memory device such as a semiconductor memory, and a communication device. Then, a program that is loaded from the auxiliary memory device to the main memory device is executed by the calculation device, thereby achieving the respective functions described later, and the present embodiment will be described below while such the known art is omitted as appropriate.

The outside control device 3 is a host controller for executing driving assistance control or autonomous driving control via the vehicle control device 2, calculates, on the basis of external environment information acquired by an external environment sensor 19 (a camera, a radar, a LiDAR, and the like), a speed instruction value and an acceleration instruction value for achieving adaptive cruise control (ACC) following the preceding car and a yaw instruction value and the like for achieving lane keep control (LKC) that maintains in-lane traveling, and outputs them, as the outside instructions, to the vehicle control device 2.

Note that in FIG. 1, the vehicle control device 2 and the outside control device 3 are separated, but both may be achieved by one ECU.

As the external environment sensor 19, for example, fisheye cameras having a viewing angle of 180° are respectively installed on the front surface, the left and right side surfaces, and the rear surface of the vehicle 1 ($19_F$, $19_{SL}$, $19_{SR}$, $19_R$), so that the relative distance and the relative speed with another vehicle, a bicycle, a pedestrian, and an object such as an obstacle present in the periphery of the vehicle 1 can be detected.

Note that in the present embodiment, the combination of the above sensors is represented as an example of the sensor configuration, but the present invention is not limited to that, an ultrasonic sensor, a stereo camera, an infrared camera, and the like may be combined, and a laser radar that can sense a peripheral range of 360° may be mounted in the ceiling of the vehicle 1. The above sensor signal (the signal outputted from the above sensor) is inputted to the vehicle control device 2 or the outside control device 3.

Here, the driving system of the vehicle 1 will be described. The vehicle 1 is equipped, as the main portion of the driving system, with a torque generation device that gives a driving force to each of the wheels 11. An example of the torque generation device is an engine or a motor that transmits the driving force to a pair of left and right wheels 11 via a differential gear and a drive shaft. Another example of the torque generation device is the in-wheel motor type motor 12 that independently drives each of the wheels 11. Hereinbelow, the detail of the present embodiment will be described on the assumption of the vehicle configuration in FIG. 1 in which the in-wheel motor type motor 12 is mounted on each of the wheels 11.

When the driver desires to move the vehicle 1 forward (or backward), the driver brings the shift lever to the desired setting to operate the accelerator pedal 16. At this time, a stroke sensor 16a detects the depression amount of the accelerator pedal 16, and an acceleration control device 16b outputs, to the vehicle control device 2, an accelerator instruction that has converted the depression amount. The vehicle control device 2 supplies electric power according to the inputted accelerator instruction from a battery, not illustrated, to the motor 12 for each wheel, and controls each motor torque. As a result, the vehicle 1 can be accelerated or decelerated according to the operation of the accelerator pedal 16.

In addition, when the driving assistance or the autonomous driving is performed according to the outside instruction from the outside control device 3, the vehicle control device 2 supplies the desired electric power to the motor 12 for each wheel according to the inputted outside instruction, thereby controlling each motor torque. As a result, the vehicle 1 is accelerated or decelerated to execute the desired driving assistance or autonomous driving.

Next, the braking system of the vehicle 1 will be described. The vehicle 1 is equipped, as the main portion of the braking system, with a wheel cylinder 13a that gives a braking force to each of the wheels 11. The wheel cylinder 13a is configured of, for example, a cylinder, a piston, a pad, a disk rotor, and the like. In the wheel cylinder 13a, the piston is driven by a hydraulic fluid supplied from the master cylinder, and the pad coupled to the piston is pressed onto the disk rotor rotating together with the wheel 11, so that the brake torque acting on the disk rotor becomes the braking force acting between the wheel 11 and the road surface.

When the driver desires to brake the vehicle 1, the driver operates the brake pedal 17. At this time, the depression force obtained by depressing the brake pedal 17 by the driver is increased by a brake booster (not illustrated), and an oil pressure substantially proportional to the depression force is caused by the master cylinder. The caused oil pressure is supplied via the brake mechanism 13 to wheel cylinders $13a_{FL}$, $13a_{FR}$, $13a_{RL}$, and $13a_{RR}$ for the respective wheels, so that the piston of the wheel cylinder 13a for each wheel is pressed onto the disk rotor according to the brake pedal operation of the driver to cause the braking force in each wheel.

Note that in the vehicle 1 equipped with the vehicle control device 2, the brake booster and the master cylinder may be omitted, and in that case, the vehicle 1 may have a mechanism in which the brake pedal 17 and the brake mechanism 13 are directly coupled, and when the driver depresses the brake pedal 17, the brake mechanism 13 is directly operated.

In addition, when the driving assistance or the autonomous driving is performed according to the outside instruction from the outside control device 3, the vehicle control device 2 controls the brake mechanism 13 and the wheel cylinder 13a for each wheel via a brake control device 13b according to the inputted outside instruction. As a result, the vehicle 1 is braked, and the desired driving assistance or autonomous driving is executed.

Note that the brake control device 13b also serves as a function of converting the operation amount of the brake pedal 17 by the driver to a brake instruction and outputting, as the outside instruction, the brake instruction to the vehicle control device 2.

Next, the steering system of the vehicle 1 will be described. The vehicle 1 is equipped, as the main portion of the steering system, with the steering mechanism 14 that gives a steering force to each of the wheels 11. FIG. 1 illustrates a steering mechanism 14, on the front side that steers the front wheel 11; (the left front wheel 11$_{FL}$, the right front wheel 11$_{FR}$), and a steering mechanism 14R on the rear side that steers the rear wheel 11R (the left rear wheel 11$_{RL}$, the right rear wheel 11$_{RR}$), but both of the steering mechanism 14, on the front side and the steering mechanism 14R on the rear side are not necessarily required to be provided, and for example, the steering mechanism 14R on the rear side may be omitted.

When the driver desires to steer the vehicle 1, the driver operates the steering wheel 18. At this time, the "steering torque" and the "steering angle" inputted via the steering wheel 18 by the driver are detected by a steering torque detection device 18$a$ and a steering angle detection device 18$b$. A steering control device 14$a_F$ on the front side controls a steering motor 14$b_F$ on the front side on the basis of the detected steering torque and steering angle to generate an assist torque for steering the front wheel 11F. Likewise, a steering control device 14$a_R$ on the rear side controls a steering motor 14$b_R$ on the rear side on the basis of the detected steering torque and steering angle to generate an assist torque for steering the rear wheel 11R.

In addition, when the driving assistance or the autonomous driving is performed according to the outside instruction from the outside control device 3, the vehicle control device 2 controls the steering torque of the steering motor 14$b$ via the steering control device 14$a$. As a result, the vehicle 1 is steered to execute the desired driving assistance or autonomous driving. In that case, the steering wheel 18 may be omitted.

Next, the suspension system of the vehicle 1 will be described. The vehicle 1 is equipped, as the main portion of the suspension system, with the suspension 15 for absorbing vibration and shock caused in each of the wheels 11 to make the stability of the vehicle body and the ride comfort good. For example, the suspension 15 is a semi-active suspension in which a damper capable of changing viscosity and a coil spring are combined, or a full active suspension in which an actuator capable of adjusting the length, a damper, and a coil spring are combined, thereby being capable of arbitrarily changing the relative distance between the vehicle body and the wheel 11.

By controlling the viscosity of the semi-active suspension or the length of the full active suspension, the vehicle control device 2, not only improves the ride comfort and the like, but also appropriately controls the posture of the vehicle 1 according to environment.

Figure 2:
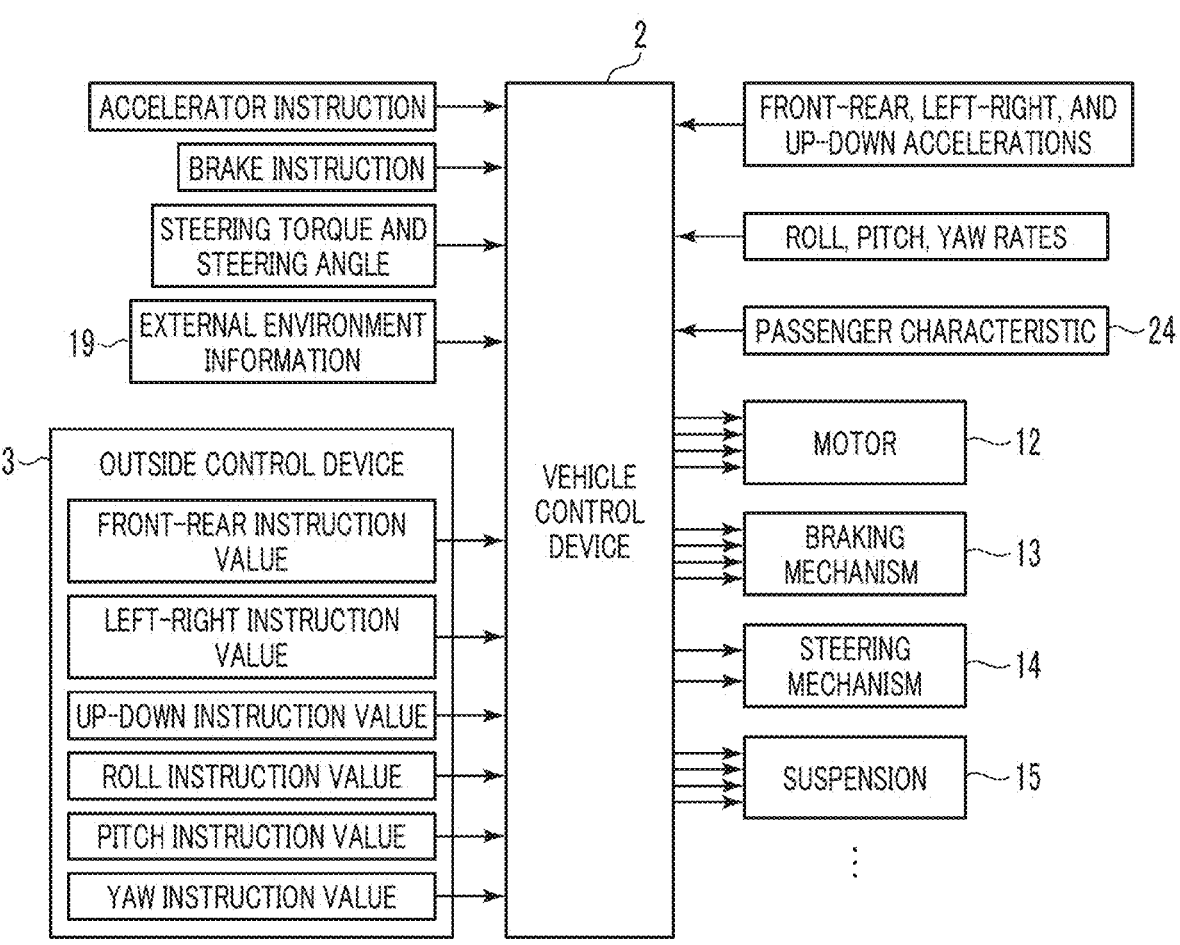
FIG. 2 is a schematic diagram illustrating the input and output signals of a vehicle control device 2 of the first embodiment.

Next, the inputs and outputs of the vehicle control device 2 will be described with reference to FIG. 2. FIG. 2 is a schematic diagram in which the input and output signals of the vehicle control device 2 are listed. As illustrated in FIG. 2, the accelerator instruction, the brake instruction, the steering torque, the steering angle, and the like that are generated by operating the accelerator pedal 16, the brake pedal 17, the steering wheel 18, and the like by the driver are inputted, as the outside instructions, to the vehicle control device 2.

In addition, the outside instructions including up to 6 degrees of freedom from the front-rear acceleration instruction value, the left-right acceleration instruction value, the up-down acceleration instruction value, the roll instruction value, the pitch instruction value, and the yaw instruction value that are generated by the outside control device 3 during the driving assistance control or during the autonomous driving control are inputted to the vehicle control device 2.

Further, the respective detection values of the respective front-rear, left-right, and up-down accelerations and the respective roll, pitch, and yaw rates are inputted from the combine sensor 4 to the vehicle control device 2.

Then, the vehicle control device 2 appropriately distributes the respective operation amounts of the motor 12 (12$_{FL}$-12$_{RR}$), the brake mechanism 13 (wheel cylinders 13$a_{FL}$-13$a_{RR}$), the steering mechanism 14 (steering motors 14$b_F$, 14$b_R$), and the suspension 15 (15$_{FL}$-15$_{RR}$) (hereinafter, the reference numerals 12-15 may be collectively called an actuator) on the basis of the above outside instructions and detection values, and executes the respective controls of the driving, braking, steering, and suspension, thereby achieving the desired vehicle control including the posture control.

Note that since the vehicle 1 in FIG. 1 responds to the manual operation, FIG. 2 also illustrates the outside instruction caused by the driver, but the present invention is adaptable also to the vehicle 1 that responds only to fully autonomous driving or remote operation, and in that case, the outside instruction caused by the driver should be omitted. During the autonomous driving, the outside instructions including up to 6 degrees of freedom may be inputted from the outside control device 3, or external environment information from the external environment sensor 19 and map information stored in the interior of the vehicle control device 2 may be used to generate a target value for the autonomous traveling. The present embodiment will be described on the assumption that a target value for the autonomous driving is generated in the interior of the vehicle control device 2.

Further, a passenger characteristic 24 (representing the posture or the like of a passenger) may be further inputted to the vehicle control device 2. For example, a camera is mounted, as a passenger characteristic acquiring unit 23, in the vehicle compartment of the vehicle 1, and the movement of the head of the passenger is measured to estimate the causing susceptibility (sensitivity) of motion sickness (carsickness). Alternatively, a mechanism in which information regarding the motion sickness (carsickness) sensitivity of the passenger during riding is acquired from the portable terminal that the passenger owns may be included.

An example regarding the passenger characteristic acquiring unit 23 will be described with reference to FIGS. 3$a$ and 3$b$. FIG. 3$a$ illustrates the vehicle 1 by taking, as an example, the case where a vehicle 1$a$ has the shape of a transit bus that perform autonomous driving. In FIG. 3$a$, a passenger characteristic acquiring unit 23$a$ is a camera having a field of view of 360° installed in the ceiling. This camera detects, as the passenger characteristic 24, the riding positions, the riding directions, the postures, the head postures, the head movements, line of sight, the tasks during riding (during reading, during sleeping, and the like), and the like of passengers 52$a$, 52'$a$. Note that the camera is not limited to such a shape and position, a plurality of cameras may be installed in the vehicle compartment, and the camera is not necessarily required to have a field of view of 360°.

Alternatively, when as illustrated in FIG. 3$b$, a vehicle 1$b$ has the shape of an automobile, a passenger characteristic acquiring unit 23$b$ may be a camera that is installed near the connection point of the windshield and the ceiling (typically, the portion in which the rearview mirror is installed). In this case, the passenger characteristic 24 of a passenger 52$b$ sitting on the rear seat is detected.

Figure 4:
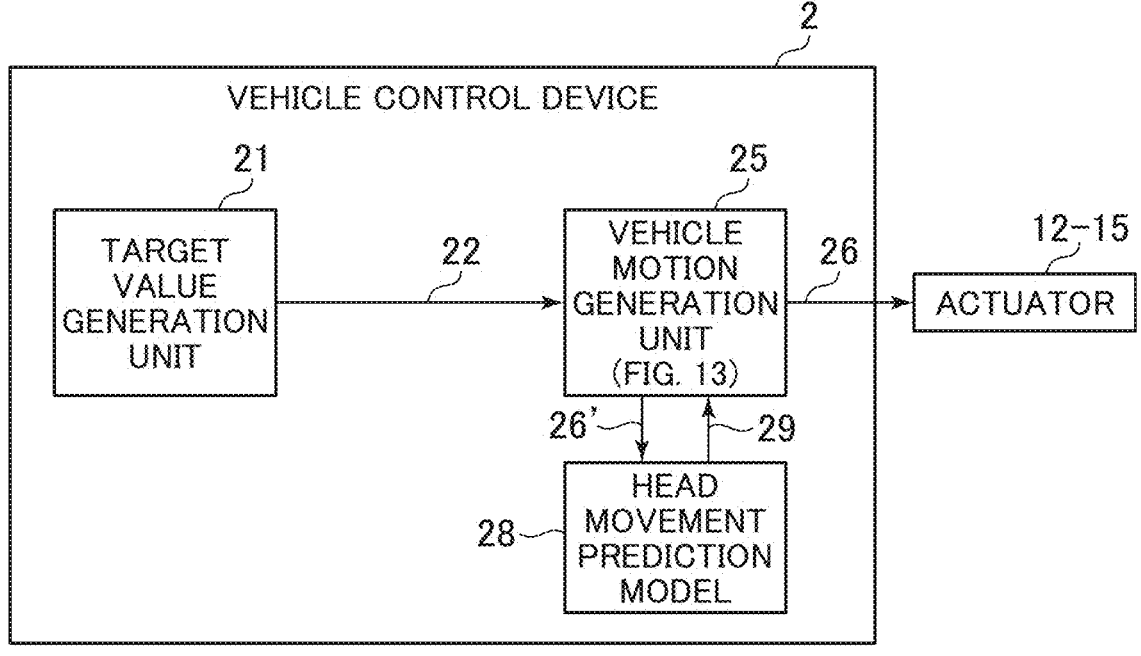
FIG. 4 is a function block diagram of the vehicle control device 2 according to the first embodiment of the present invention.

FIG. 4 is a function block diagram of the vehicle control device 2. FIG. 2 illustrates the vehicle control device 2 to which three types of outside instructions caused by the driver (the accelerator instruction, the brake instruction, and the steering torque and the steering angle) are inputted and to which up to 6 types of outside instructions from the outside control device 3 are inputted, but in the present embodiment, the detail of the vehicle control device 2 of the present embodiment will be described by taking, as an example, the configuration in which the target value for the autonomous driving is generated in the interior of the vehicle control device 2, as described above.

As illustrated in FIG. 4, the vehicle control device 2 of the present embodiment is configured of at least a target value generation unit 21, a vehicle motion generation unit 25, or a head movement prediction model 28, and finally, outputs vehicle motion 26 to the actuator 12-15.

The target value generation unit 21 uses, as target values 22, vehicle motion targets such as to achieve the particular driving task in the autonomous driving (following a path, traveling at the same speed as the preceding car, and the like) to output the target values 22 to the vehicle motion generation unit 25. The target values 22 typically include three types of instruction values including the front-rear acceleration instruction value, the left-right acceleration instruction value, and the yaw instruction value, and in addition, up to 6 types of instruction values including the front-rear acceleration instruction value, the left-right acceleration instruction value, the yaw instruction value, the roll angle instruction value, the pitch angle instruction value, and the up-down direction acceleration instruction value should be generated. Note that when three types of outside instructions caused by the driver (the accelerator instruction, the brake instruction, and the steering torque and the steering angle) are inputted, the target value generation unit 21 converts those outside instructions to the front-rear acceleration instruction value, the left-right acceleration instruction value, and the yaw instruction value to output them as the target values 22.

The vehicle motion generation unit 25 corrects the target value 22 of the type that has been inputted, generates the target value of the type that has not been inputted, and outputs the vehicle motion 26 that is the motion and the posture including up to 6 degrees of freedom of the vehicle (front and rear, left and right, up and down, roll, pitch, and yaw). Here, the vehicle motion generation unit 25 serves as a role of generating the vehicle motion target that takes into consideration the improvement of the ride comfort and the reduction of the motion sickness, and generates the vehicle motion 26 so as to optimize a motion sickness sensitivity index on the basis of a head movement feature 29 of the passenger calculated by the head movement prediction model 28 described later. An example of a specific generation method thereof will be described later.

The head movement prediction model 28 receives, as an input, vehicle motion 26' that is the cause factor of the head movement causing to finally provide the head movement feature 29 of the passenger. Here, as an example of the motion sickness sensitivity index that evaluates the motion sickness sensitivity of the passenger, a motion sickness incidence MSI that is the incidence of the motion sickness (so-called "carsickness") will be described.

Figure 5:
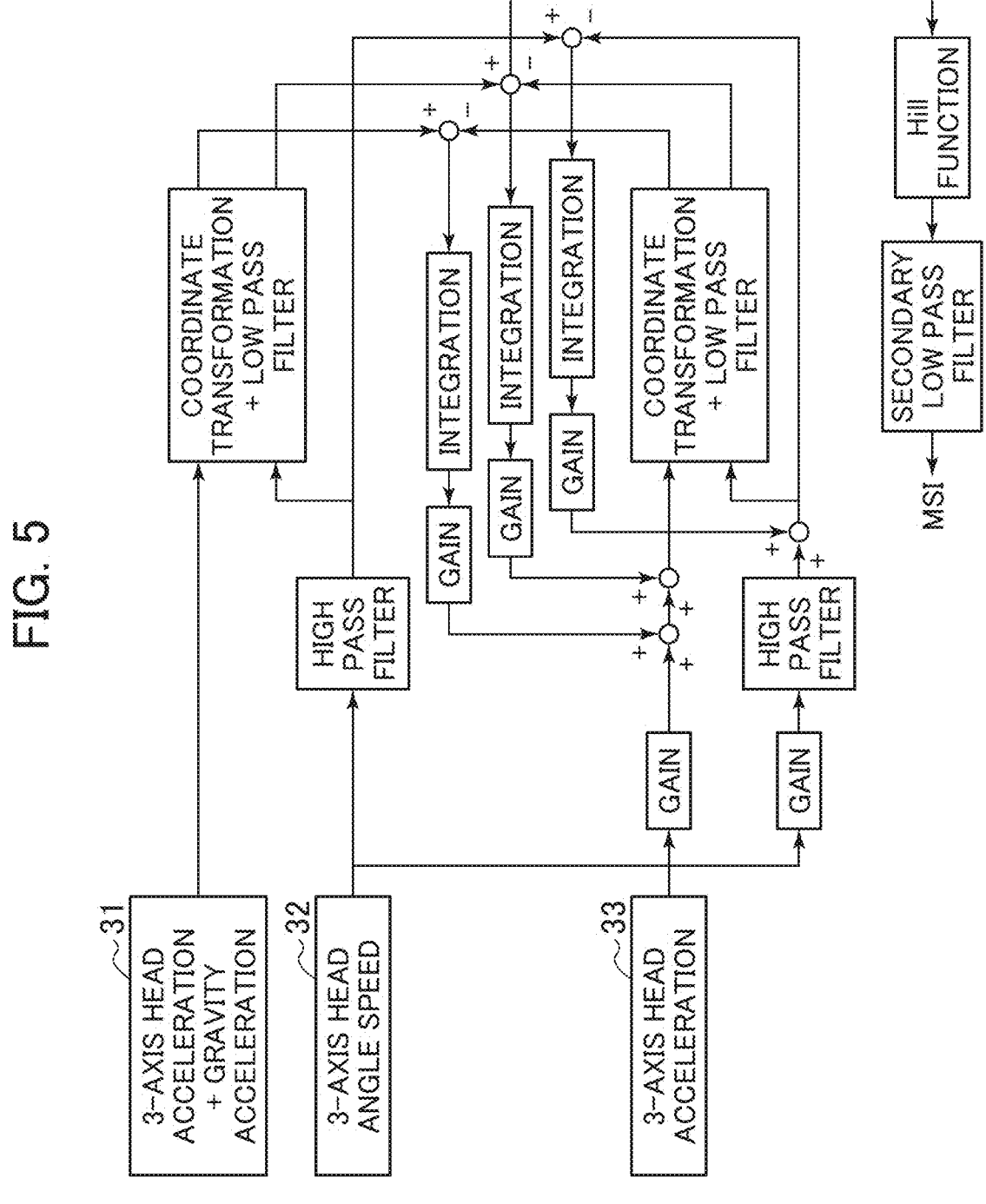
FIG. 5 is a function block diagram illustrating a method of calculating a motion sickness incidence MSI.

It is known, from a thesis and the like, that the motion sickness incidence MSI can be calculated by, for example, the calculation method as illustrated in FIG. 5. The detailed description of FIG. 5 is omitted, but according to this method, as the vehicle motion 26' that is the cause factor of the head movement cause, 3-axis head acceleration+gravity acceleration 31, a 3-axis head angle speed 32, and 3-axis head acceleration 33 are inputted, and the motion sickness incidence MSI can be calculated on the basis of the process as illustrated in FIG. 5.

Note that the "head acceleration" and the "head angle speed" in FIG. 5 are the acceleration and the angle speed received by the head of the passenger during riding in the vehicle 1. Since the motion sickness incidence MSI is an index that determines the vehicle motion in which as its value is smaller, the motion sickness is less likely to be caused, it is desirable to generate the target value of the vehicle motion such that the motion sickness incidence MSI becomes small. It is known that the MSI is reduced from the result that when inertial acceleration is generated in the head during curve traveling or the like, the movement in the roll or pitch direction caused in the head is made as small as possible (or the roll angle or the pitch angle is caused in the opposite direction of the inertial acceleration direction, that is, in the direction against the inertia).

As another example of the motion sickness sensitivity index, an MSDV (Motion Sickness Dose Value) is given. This is a value obtained by extracting the particular frequency component that, in particular, is likely to cause the motion sickness, in the acceleration caused in the human body, and it is typically known that as this value is higher, the motion sickness is more likely to be caused. Therefore, when this sensitivity index is noted, the vehicle motion to control the front-rear, left-rear, and up-down accelerations such that the particular frequency component is not generated is generated.

As a still another example of the motion sickness sensitivity index, a biological signal (for example, sweating, heartbeat, and the like) is given. It is typically known that when the passenger causes the motion sickness, the increase in the number of heartbeats and the sweating of the palm or the forehead are found. Therefore, when this sensitivity index is noted, the target value of the vehicle motion is generated so as to improve the biological signal.

The head movement prediction model 28 has a physical model that receives the temporary or final vehicle motion 26' from the vehicle motion generation unit 25, and calculates, into the future, the prediction value of the head movement (the motion amounts and the posture angles of the six axes of the head of the passenger) that can be caused by the vehicle motion 26' for the passenger during riding.

Since the parameter of the physical model differs depending on passenger, the head movement prediction model 28 has a role of storing the parameter. Then, the prediction value of the head movement that can be caused by the vehicle motion 26' or the stored parameter is transmitted, as the head movement feature 29, to the vehicle motion generation unit 25, thereby providing information that becomes a criterion for the vehicle motion generation unit 25 to generate the final vehicle motion 26.

Figure 6A:
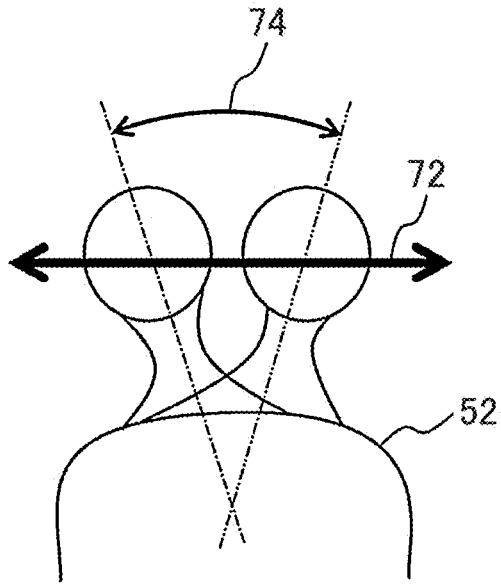
FIG. 6a is a diagram illustrating a state where a head roll angle is caused by lateral acceleration with respect to a passenger.
Figure 6B:
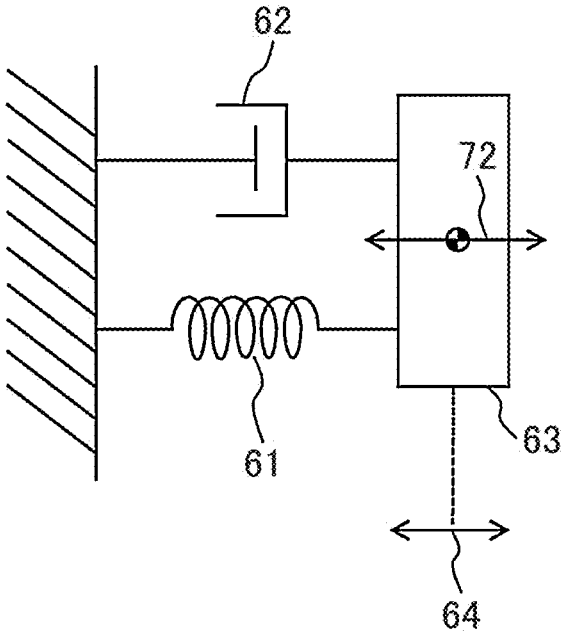
FIG. 6b is a diagram illustrating an example in which as a physical model, a spring-mass-damper dynamic model is adopted.

An example of the operation of the head movement prediction model 28 will be described with reference to FIGS. 6a, 6b, and 7. FIG. 6a illustrates a state where a head roll angle 74 is caused by lateral acceleration 72 with respect to a passenger 52. FIG. 6b illustrates an example of the case where as the physical model that predicts the head movement, a typical spring-mass-damper dynamic model is adopted. Note that although in FIGS. 6a and 6b, the present embodiment will be described by taking, as an example, the roll direction, the pitch direction can also be represented by the same model. In addition, as described later, the present invention has a feature of having the association between the roll direction and the pitch direction.

First, as illustrated in FIG. 6a, when the lateral acceleration 72 is caused with respect to the passenger 52, inertial acceleration is generated in the head to generate the head roll angle 74. At this time, it is known that the neck (the connection portion of the shoulder and the head) of the passenger 52 typically has the characteristic of the spring (causing a reaction force proportional to the displacement) and the damper (causing a reaction force proportional to the change with time in the displacement). When this configuration is simplified as the head movement model, as illustrated in FIG. 6b, this configuration is represented as a configuration in which an inertia 63 is grounded via a spring 61 and a damper 62.

The dynamic input to this model is the inertial acceleration caused at the center of gravity point of the inertia 63, and displacement 64 that is thus caused is equal to the head roll angle 74. By assuming such a model, the change with time in the head roll angle 74 of the passenger caused by the change with time in the lateral acceleration set by the target value 22 can be estimated.

The coefficients of the spring 61 and the damper 62 illustrated in FIG. 6b are considered to be different according to person (there are individual differences), and an example of the parameters of the head movement prediction model 28 includes the coefficients of the spring 61 and the damper 62. Typically, as the coefficient of the spring or the damper is larger, the movement of the head is smaller. Now, when the displacement 64 corresponding to the head roll angle of the passenger is X, a first order differential regarding the time is X', and a second order differential is X", the spring coefficient of the spring 61 is K, the damping coefficient of the damper 62 is C, the mass of the inertia 63 is M, and the inertial acceleration caused at the center point of gravity of the inertia 63 is Ax, a motion equation as expressed by Equation (1) is calculated in the interior of the head movement prediction model 28.

[Mathematical 1]

$$MX'' = MAx - KX - Cx' \tag{1}$$

An example of a behavior difference due to the difference in the parameter (K, C) will be described with reference to FIG. 7. The upper stage, the middle stage, and the lower stage in FIG. 7 illustrate the state of the lane change of the vehicle, the variation in the lateral acceleration at that time, and the head roll angle of the passenger at that time, respectively.

Figure 7:
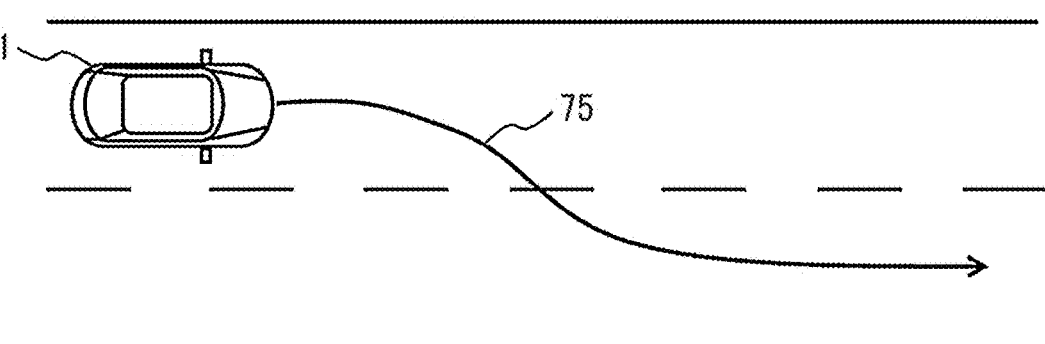
FIG. 7 is a diagram illustrating a plan view illustrating the vehicle 1 that performs lane change and an example of the changes in lateral acceleration 72 of the vehicle 1 and a head roll angle 74 of a passenger 52 at that time.
Figure 7:
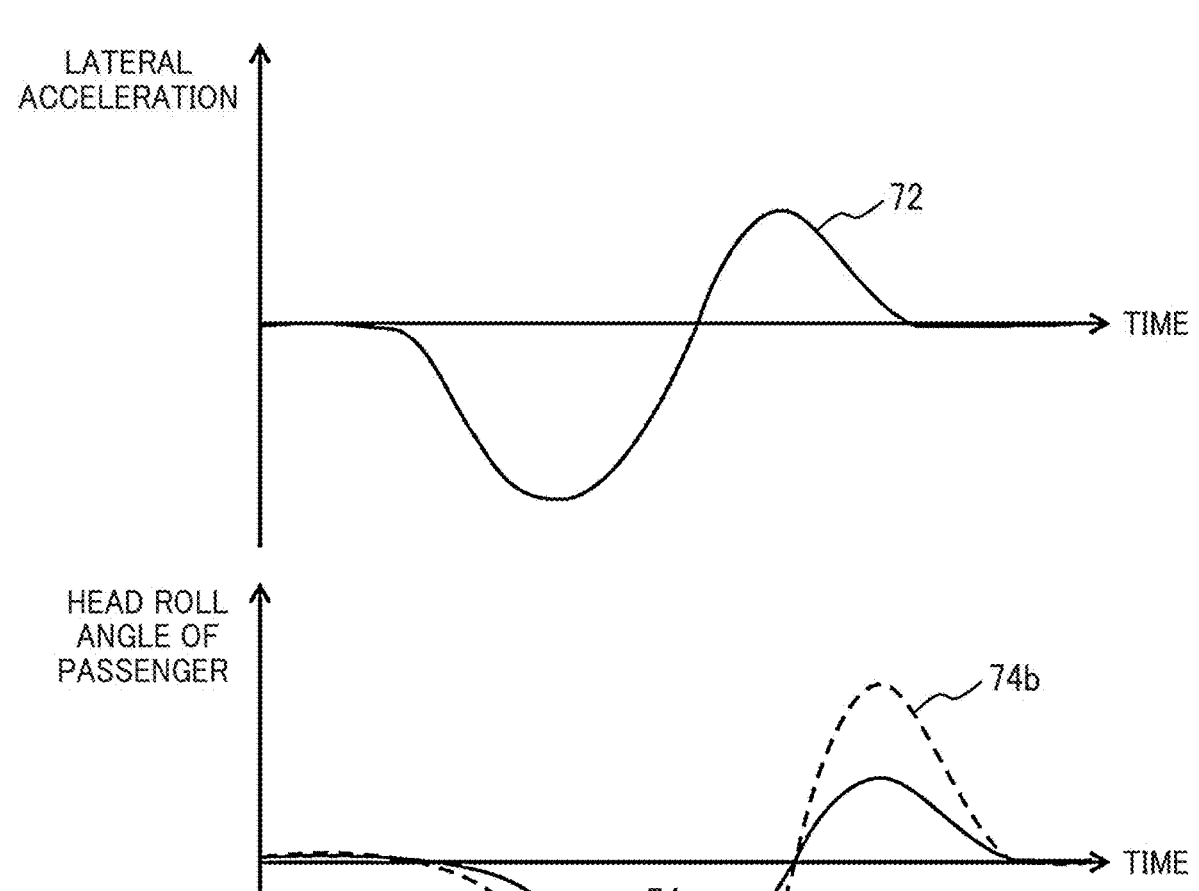

Here, the case where the vehicle 1 performs lane change from the left to the right on a two-lane road is assumed, and the lateral acceleration 72 is caused like the middle stage in FIG. 7. That is, the vehicle 1 is first steered in the right direction to cause the negative lateral acceleration, and next, the vehicle 1 is steered in the left direction to cause the positive acceleration. At this time, between a passenger a whose head is unlikely to be moved and a passenger b whose head is likely to be moved, head roll angles 74a and 74b with respect to the same lateral acceleration 72 are different. For example, in FIG. 7, the magnitude of the amplitude of the head roll angle 74b is substantially twice the magnitude of the amplitude of the head roll angle 74a, so that the magnitude of the spring coefficient K or the damping coefficient C identified of the passenger b is assumed to be substantially half the magnitude of the spring coefficient K or the damping coefficient C identified of the passenger a.

Note that in the head movement prediction model 28, aside from the spring, the mass, and the damper, an input proportional to the lateral acceleration may be additionally added. This simulates the active reaction of the human body, and assumes a reaction in which when the lateral acceleration is perceived in the head, a force proportional to the lateral acceleration is caused in the direction against the caused lateral acceleration, to attempt to suppress the head movement. When the proportional coefficient of this active movement is L, a motion equation as expressed by Equation (2) is calculated in the interior of the head movement prediction model 28.

[Mathematical 2]

$$MX'' = MAx - KX - CX' - LAx \tag{2}$$

Figure 8:
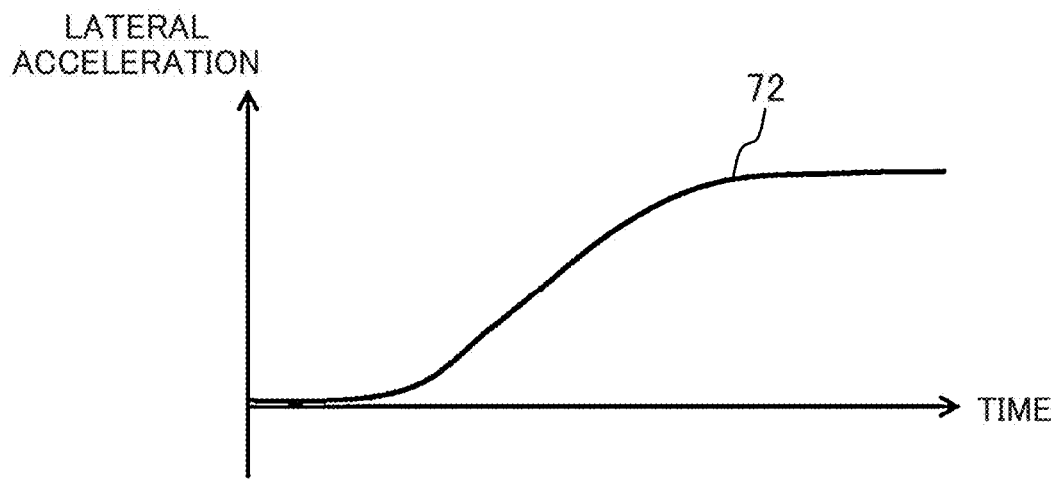
FIG. 8 is a diagram conceptually illustrating an example of the function of a vehicle motion generation unit 25 of the first embodiment.
Figure 8:
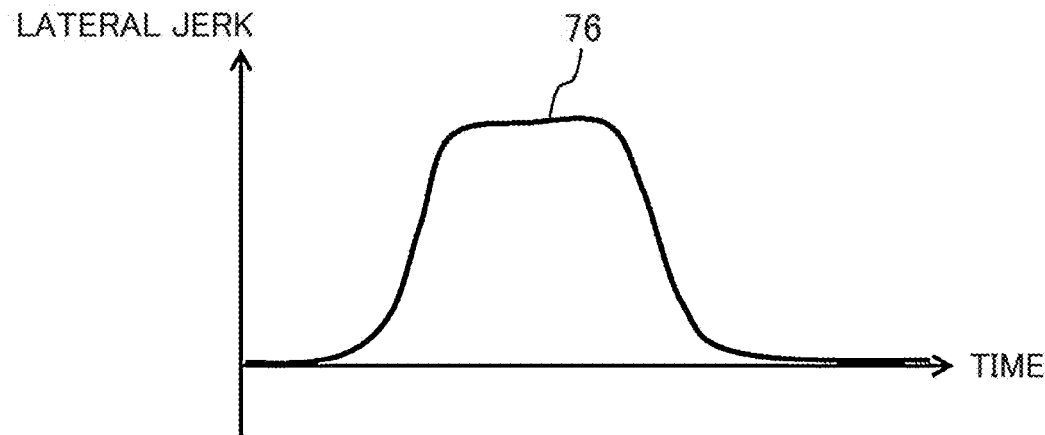
Figure 8:
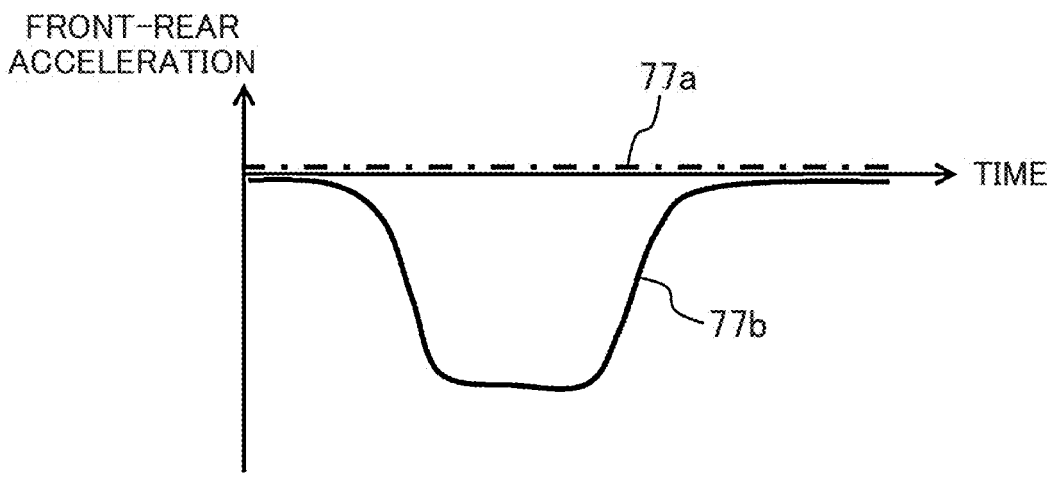

The association between the roll direction and the pitch direction of the head movement prediction model 28 will be described with reference to FIGS. 8 to 11. FIG. 8 is a schematic diagram illustrating the feature of the vehicle motion of a G-Vectoring control (GVC) proposed as the vehicle motion that achieves the good steering properties and ride comfort. From the top, the lateral acceleration 72, lateral jerk 76 that is the time derivative of the lateral acceleration 72, and front-rear acceleration 77 are represented. In this drawing, the vehicle motion generated at the time of entering a left curve is assumed.

Represented is time elapse in which when the vehicle enters the left curve with a gentle curve to be steered in the left direction, the lateral acceleration 72 starts to be increased from a certain point of time, the vehicle reaches the curve having a constant curvature from the gentle curve, and thereafter, the lateral acceleration becomes the constant value. At this time, the lateral jerk represents a certain value larger than 0 while the vehicle travels through the gentle curve (the steering angle is gradually increased). The GVC has a feature in which the front-rear acceleration proportional to the absolute value of the lateral jerk is caused in the opposite direction (that is, when the magnitude of the lateral jerk is increased, the front-rear acceleration is caused in the deceleration direction).

The method of setting the proportional coefficient (a GVC gain 66) of the front-rear acceleration with respect to the absolute value of the lateral jerk is the feature of the present invention.

In the vehicle in which the GVC is not performed, as indicated by front-rear acceleration 77a, the front-rear acceleration remains 0 and is not changed, and the vehicle enters the curve at the constant speed, but in the vehicle on which the GVC is mounted, as indicated by front-rear acceleration 77b, the front-rear acceleration having a magnitude proportional to the lateral jerk 76 is caused in the deceleration direction.

Figure 9:
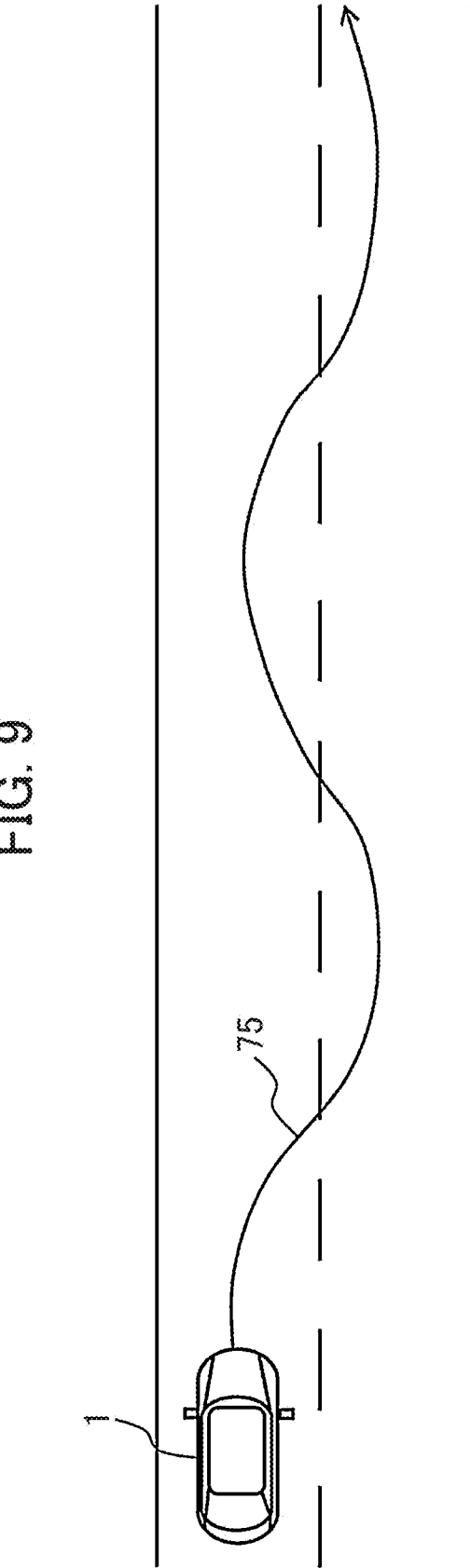
FIG. 9 is a diagram illustrating a method of measuring the change in the head behavior of the passenger by a GVC.
Figure 10:
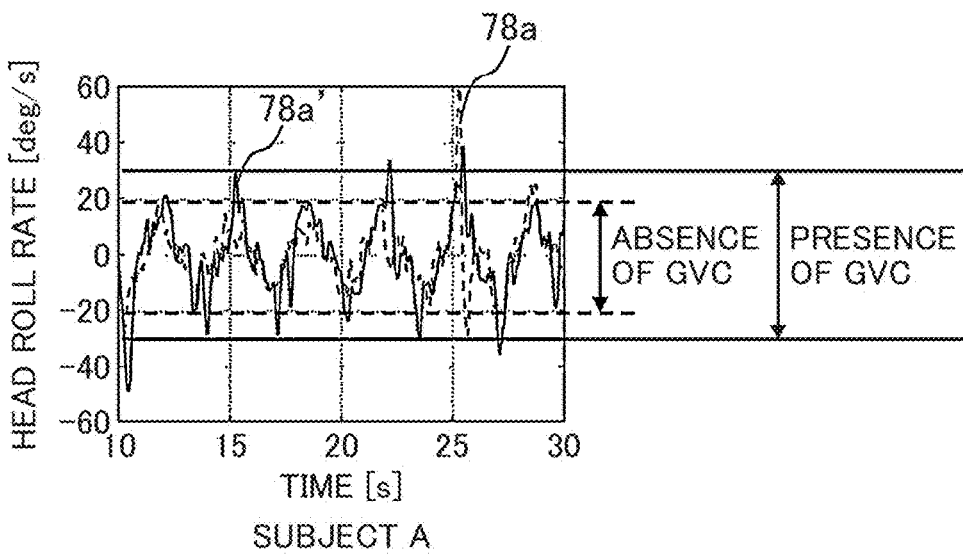
FIG. 10 is a diagram illustrating results obtained by measuring the change in the head behavior of the passenger by the GVC.
Figure 10:
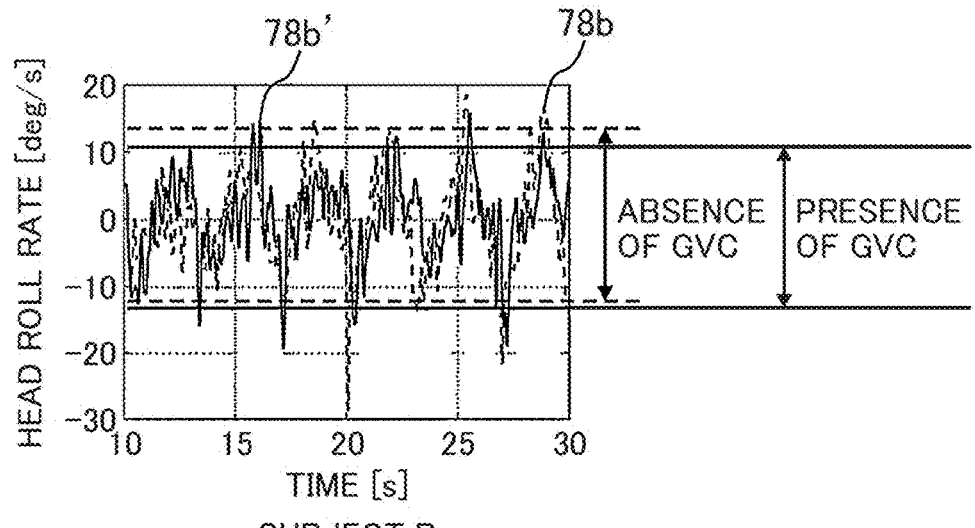
Figure 10:
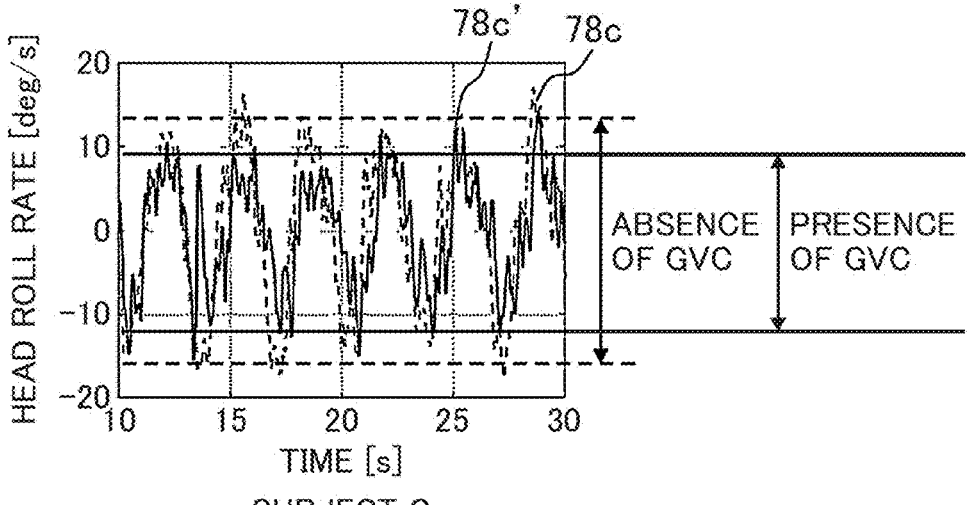
Figure 11:
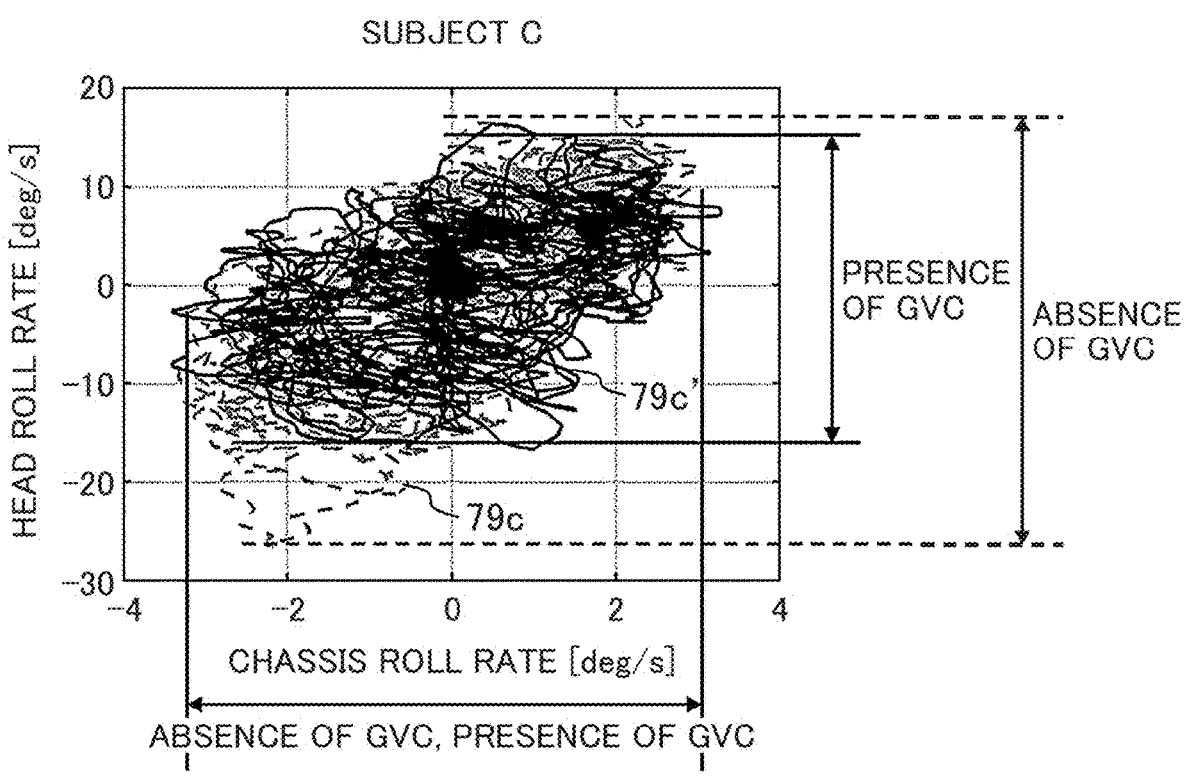
FIG. 11 is a diagram illustrating results obtained by measuring the change in the head behavior of the passenger by the GVC.

FIGS. 9 to 11 illustrate results obtained by measuring how the head movement of the passenger is changed when the vehicle motion of the GVC as illustrated in FIG. 8 is caused. First, like FIG. 9, slalom traveling in which the vehicle continues to move in the left and right directions between the lanes is performed. The change with time in a head roll rate 78 (the roll rate is the time derivative of the roll angle) of the passenger at this time is as illustrated in FIG. 10. Here, the measurement is made for three subjects A, B, and C, the dashed line indicates the "the absence of the GVC", and the solid line indicates "the presence of the GVC". Here, the absence of the GVC corresponds to the movement of the front-rear acceleration 77*a* in FIG. 8, and the presence of the GVC corresponds to the movement of the front-rear acceleration 77*b* in FIG. 8.

In FIG. 10, it is found that in the subject A, the amplitude of the head roll rate of a roll rate 78*a*' in the presence of the GVC is larger than the amplitude of the head roll rate of a roll rate 78*a* in the absence of the GVC. On the other hand, in the subjects B and C, the amplitude of the head roll rate in the presence of the GVC (78*b*', 78*c*') is smaller than the amplitude of the head roll rate in the absence of the GVC (78*c*, 78*c*). This represents that the front-rear acceleration having a magnitude proportional to the lateral jerk 76 at steering is generated in the deceleration direction, so that the head movement of the passenger may be reduced and there are individual differences in its effect.

FIG. 11 illustrates a Lissajous waveform 79 in which for the subject C having the highest head movement reduction effect in the presence of the GVC, the roll rate caused in the vehicle is taken on the horizontal axis, and the roll rate of the head is taken on the vertical axis. When the value ranges on the horizontal axis are noted, the value ranges in the dashed line for the absence of the GVC and the solid line for the presence of the GVC are substantially the same. That is, this represents that in the roll rate amplitude of the vehicle, there is almost no difference due to the presence and absence of the GVC. This shows the fact that the GVC just performs the control in the front-rear direction and that the change given in the horizontal (roll) direction is slight. On the other hand, it is found that on the vertical axis, the value range in the presence of the GVC is narrower as compared with the absence of the GVC and the amplitude of the head roll rate 78 becomes small.

In this way, it is found that regardless that there is little difference in the vehicle motion in the horizontal (roll) direction of the vehicle, the addition of the change in the movement in the front-rear direction has an effect on the head roll rate of the passenger. The present invention uses this event (principle) to reduce the movement of the head of the passenger in the horizontal (roll) direction by controlling the front-rear motion.

Figure 12A:
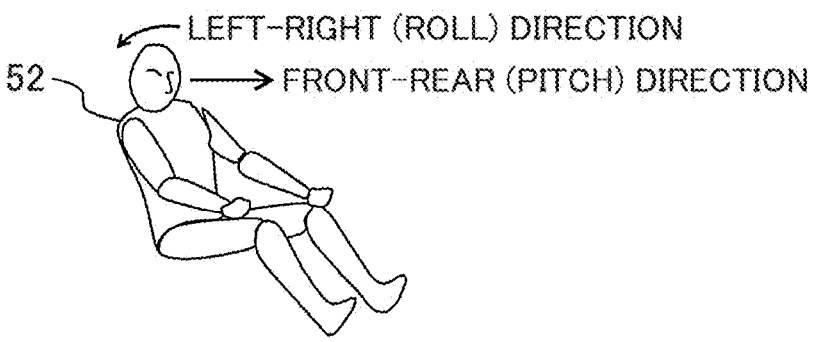
FIG. 12a is a diagram illustrating the definition of the front-rear direction and the left-right direction for the head of the passenger.

An example in which the head movement prediction model 28 has the association between the roll direction and the pitch direction as above will be described with reference to FIGS. 12*a* and 12*b*. FIG. 12*a* is an explanatory view illustrating the definition of the front-rear (pitch) direction and the left-right (roll) direction for the head of the passenger 52. In the present invention, the direction in which the passenger 52 faces is defined as the front-rear direction, and the translation direction orthogonal to the front-rear direction is defined as the left-right direction.

Figure 12B:
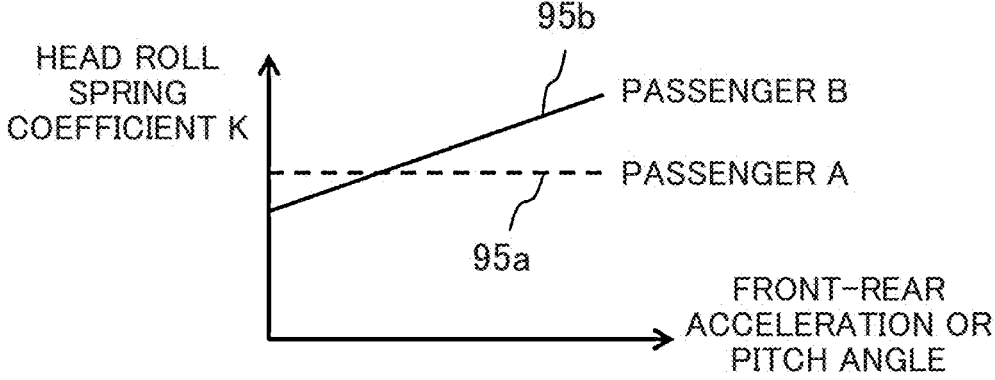
FIG. 12b is a diagram illustrating an example of the setting of a spring coefficient K of a spring 61 in the left-right direction in a head movement prediction model.

FIG. 12*b* illustrates an example of the setting of a spring coefficient K of the spring 61 in the left-right (roll) direction in the head movement prediction model 28. This drawing represents the front-rear acceleration or the magnitude of the pitch angle (which may be taken based on the vehicle, or may be taken based on the head of the passenger) on the horizontal axis, and the vertical axis represents a spring coefficient 65 assumed by the head movement prediction model 28. Note that as the vehicle motion amount in the front-rear direction, the front-rear acceleration and the pitch angle are taken as an example for description, but the front-rear jerk and the pitch rate that are the respective time derivatives may be controlled. In the description thereafter, the vehicle motion amount in the front-rear direction will be described by being represented as "the front-rear acceleration".

FIG. 12*b* assumes the passenger A as the subject A in FIG. 10, and illustrates the characteristic in which there is no head movement reduction effect due to the generation of the front-rear acceleration (or on the contrary, the head movement becomes large). In this drawing, a spring coefficient 65*a* is not changed by the front-rear acceleration or the pitch angle, and is plotted as the characteristic parallel to the horizontal axis, but the characteristic of the subject A in FIG. 10 may be set as the continuously decreasing characteristic. In addition, in the region in which the front-rear acceleration is sufficiently large, the characteristic of the passenger B may also be set to the characteristic in which a spring coefficient K is changed to be continuously decreased in the region exceeding certain front-rear acceleration.

On the other hand, when the front-rear acceleration or the pitch angle is not caused, a spring coefficient 65*b* of the passenger B is smaller than the spring coefficient 65*a* of the passenger A. That is, when steering is performed in the same manner, unless the front-rear acceleration is caused, it is suggested that the passenger B has a larger head movement than the passenger A, that is, is likely to cause the motion sickness.

On the other hand, when the magnitude of the front-rear acceleration is larger than 0, the characteristic in which the spring coefficient 65*b* is continuously increased and exceeds the spring coefficient 65*a* of the passenger A at a certain point is set. This suggests that by giving the front-rear acceleration at steering, on the contrary, the head movement of the passenger B can be reduced as compared with the head movement of the passenger A, that is, the passenger B can be suppressed from being likely to cause the motion sickness.

Figure 13:
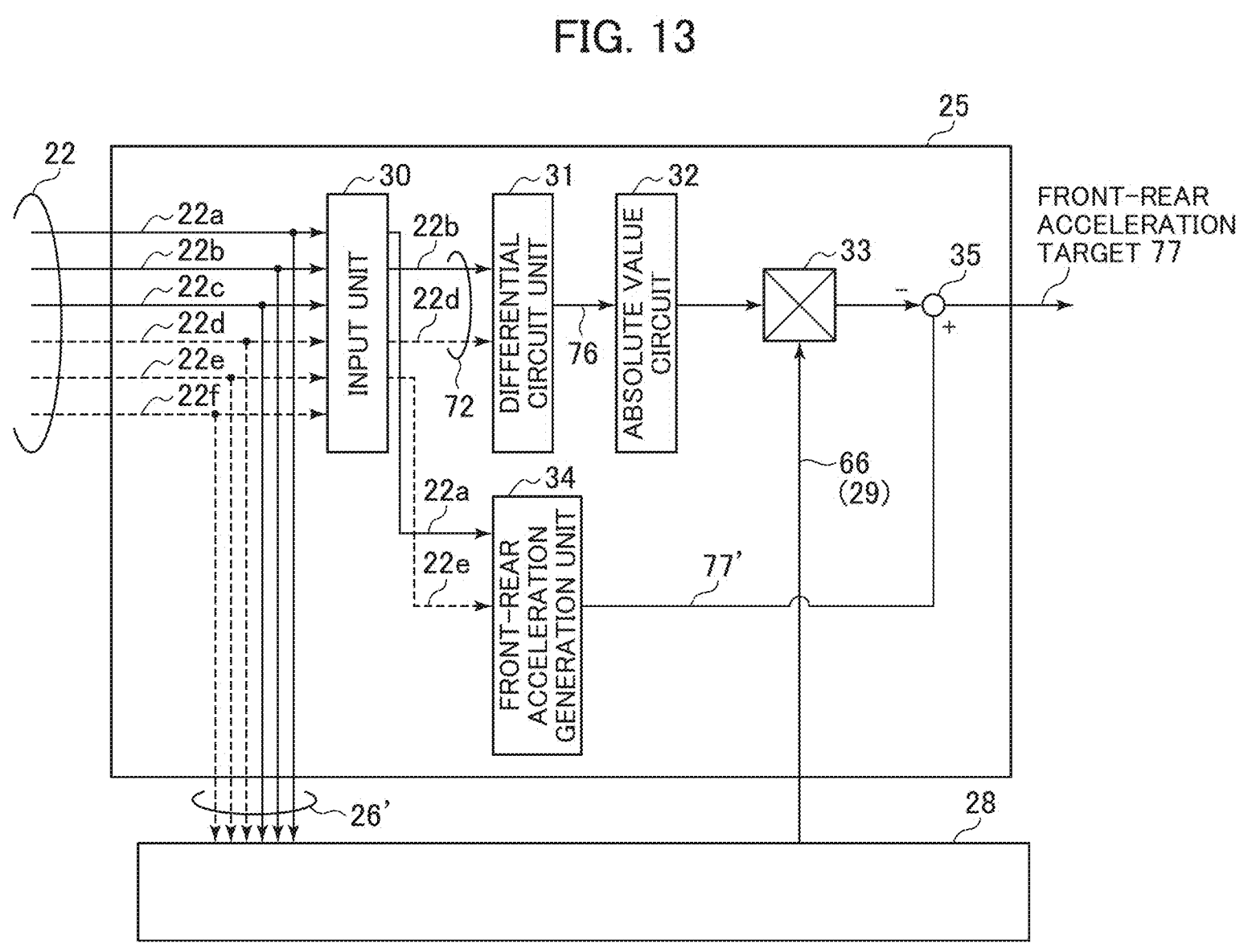

According to the above analysis results for the head movement feature of the passenger caused by the vehicle motion, in the present invention, the vehicle motion generation unit 25 in FIG. 4 is configured like, for example, FIG. 13. In FIG. 13, the vehicle motion targets 22 that are inputs given to an input unit 30 in the vehicle motion generation unit 25 include a front-rear acceleration instruction value 22*a*, a left-right acceleration instruction value 22*b*, and a yaw instruction value 22*c*, and in addition, should further include up to 6 types of instruction values including the front-rear acceleration instruction value 22*a*, the left-right acceleration instruction value 22*b*, the yaw instruction value 22*c*, a roll angle instruction value 22*d*, a pitch angle instruction value 22*e*, and an up-down direction acceleration instruction value 22*f*.

In addition, these vehicle motion targets 22 are given as the vehicle motion 26' to the head movement prediction model 28, and are used for the MSI derivation in FIG. 4 by using the 3-axis head acceleration+gravity acceleration 31, the 3-axis head angle speed 32, and the 3-axis head acceleration 33 that are generated from these.

The vehicle motion generation unit 25 corrects the target value 22 of the type that has been inputted, generates the target value of the type that has not been inputted, and executes various processes for outputting the vehicle motion 26 that include the motions and the postures including up to 6 degrees of freedom (front and rear, left and right, up and down, roll, pitch, and yaw) of the vehicle, but FIG. 13 illustrates only the processing portion with respect to the front-rear acceleration regarding the present invention. Therefore, although not illustrated in FIG. 13, the vehicle motion generation unit 25 can include a control circuit that achieves the reduction of the motion sickness due to the head movement in the left-right direction by suppressing and controlling the motion amount in the left-right direction.

In the basic process with respect to the front-rear acceleration, the vehicle motion generation unit 25 notes, of the inputted instruction values, the front-rear acceleration instruction value 22a and the pitch angle instruction value 22e that are the vehicle motion targets 22 with respect to the front-rear acceleration, and acquires a front-rear acceleration target 77' in a front-rear acceleration generation unit 34. After the correction in a subtraction unit 35, the front-rear acceleration target 77' is sent, as a front-rear acceleration target 77, from the vehicle motion generation unit 25 to the actuator 12-15.

In the correction process of the present invention with respect to this, by focusing the left-right acceleration instruction value 22b and the roll angle instruction value 22d related to the lateral acceleration 72, these are differentiated in a differential circuit unit 31 to be the lateral jerk 76, and further, the magnitude of the lateral jerk 76 is calculated by an absolute value circuit 32. A signal obtained by multiplying the magnitude of the lateral jerk 76 by the GVC gain 66 given from the head movement prediction model 28 by a multiplication circuit 33 is outputted, as the front-rear acceleration target 77, from the vehicle motion generation unit 25 after the correction with respect to the front-rear acceleration target 77' in the subtraction unit 35.

As apparent from the comparison of FIGS. 4 and 13, the head movement feature 29 of the passenger from the head movement prediction model 28 in FIG. 4 is achieved as the GVC gain 66 in FIG. 13.

In this case, whether or not the GVC gain 66 is given or its magnitude is individually set for each passenger by the judgment of the head movement prediction model 28. The GVC gain 66 is typically the value in the range of 1 to 0. From the processing result in the head movement prediction model 28, adjustment is made so as to reflect the front-rear acceleration instruction determined by the target value generation unit 21 onto the driving as-is such that the GVC gain 66 is a large value with respect to the passenger judged to be likely to be carsick to perform the driving that reduces the front-rear acceleration, and the GVC gain 66 is a small value with respect to the passenger judged to be unlikely to be carsick.

Figure 14:
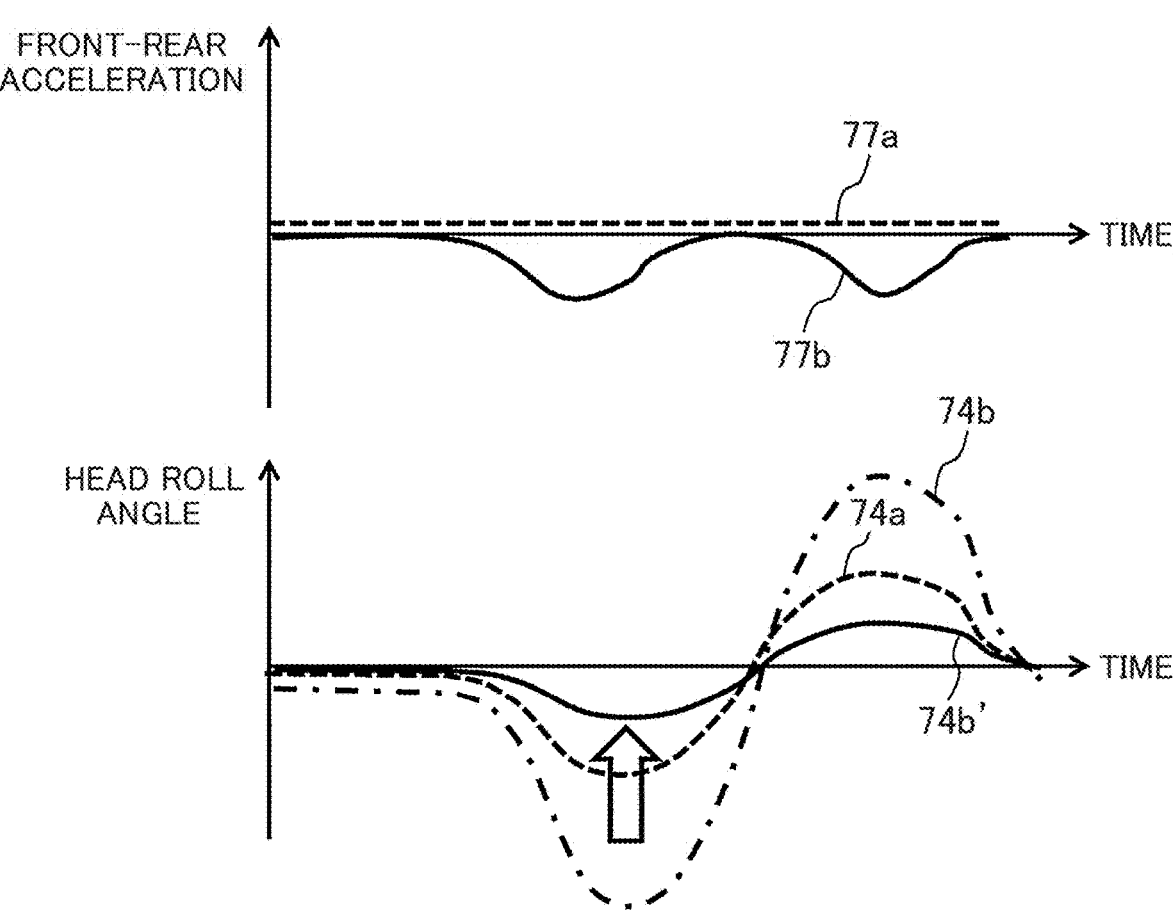
FIG. 14 is a diagram illustrating an example of the change in vehicle motion caused by the vehicle motion generation unit 25 of the first embodiment.

A specific example in which the vehicle motion generation unit 25 generates the vehicle motion 26 will be described with reference to FIGS. 14 to 18. FIG. 14 illustrates an example in which when the target value 22 of the lane change described with reference to FIG. 7 is generated, the vehicle motion generation unit 25 generates, as the vehicle motion 26, the front-rear acceleration 77. Here, the difference in the behavior will be described by taking, as an example, the same passengers A and B as FIG. 12.

In the upper diagram in FIG. 14, it is found that like the front-rear acceleration 77a, the front-rear acceleration is not generated with respect to the passenger A (the vehicle travels at the constant speed), and on the other hand, the front-rear acceleration 77b is generated with respect to the passenger B in the deceleration direction when the steering angle is increased at the start of the lane change and when the steering angle is increased in the opposite direction for converging to the adjacent lane. This means that the proportional coefficient (GVC gain 66) described with reference to FIG. 8 is set to 0 with respect to the passenger A, and is set to a certain value larger than 0 with respect to the passenger B.

The lower diagram in FIG. 14 illustrates an example in which how the head roll angle 74 of each of the passengers A and B is changed with time due to the generation of the front-rear acceleration. Now, in the case where the head roll angle 74a of the passenger A is caused like the dashed line, when the vehicle travels such that like the 77a, the front-rear acceleration is not generated (the vehicle travels at the constant speed) as in the passenger A, the head roll angle of the passenger B is generated at an amplitude larger than the amplitude of the passenger A like the dashed-and-dotted line indicated by the 74b.

On the other hand, when the front-rear acceleration is generated with respect to the passenger B like the 77b, the head roll angle of the passenger B is generated at an amplitude smaller than the amplitude of the passenger A like the solid line indicated by 74b'. This is the head movement reduction effect according to the present invention.

Figure 15:
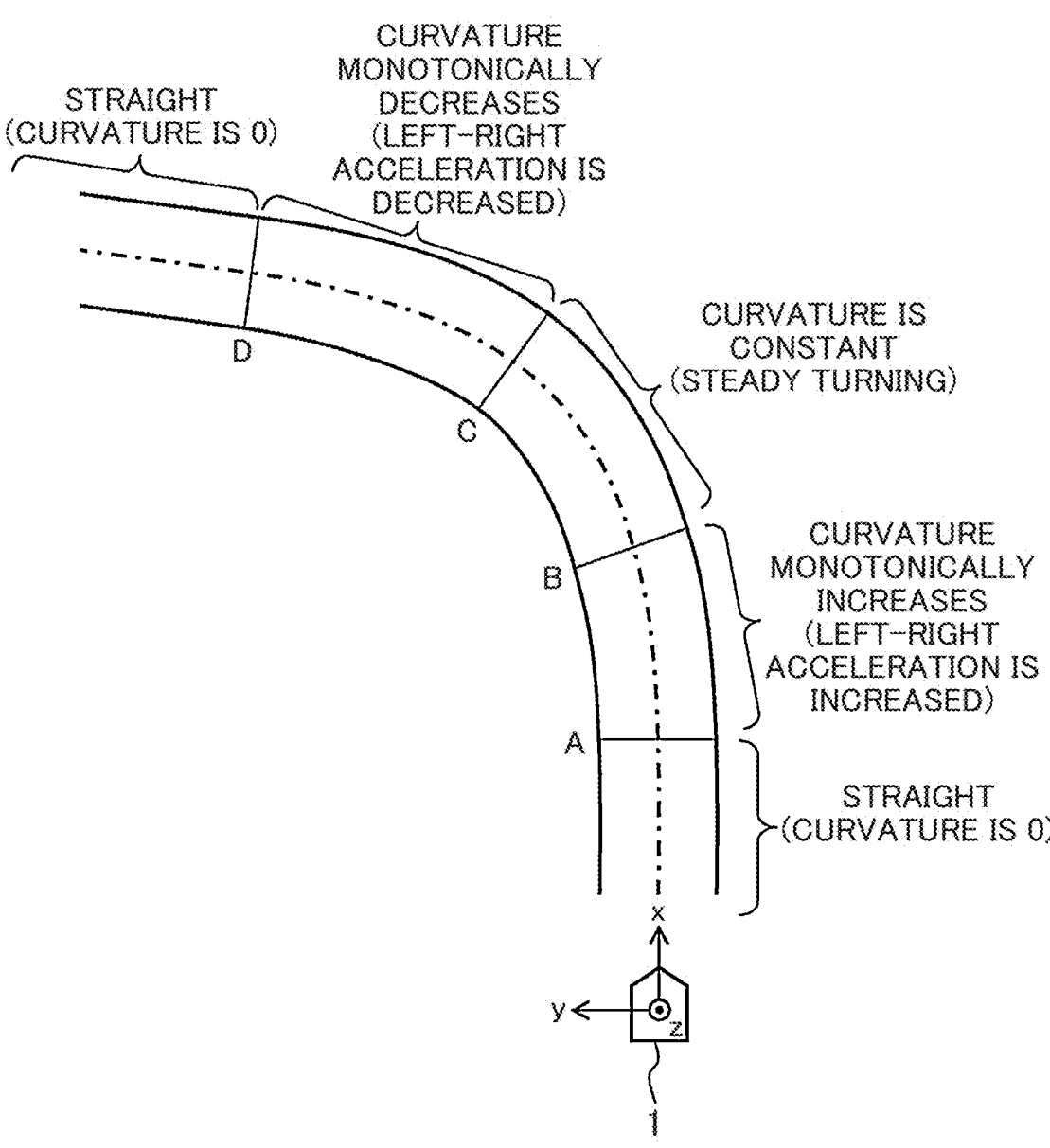
FIG. 15 is a plan view illustrating the vehicle 1 that enters a left curve.

FIG. 15 is a plan view illustrating the vehicle 1 that enters a left curve. The road shape described here is the left curve, and the vehicle 1 enters the road having the shape of the left curve. Here, the driving movement executed here is the left turn. The behavior example described with reference to FIGS. 16 to 18 will be described by taking, as an example, the case of the left curve passing illustrated in FIG. 15.

The road illustrated in FIG. 15 is divided into a first section (to A) in which the curvature is 0 (straight), a second section (A to B) in which the curvature gradually increases (the curvature monotonically increases: the left-right acceleration is increased), a third section (B to C) in which the curvature is constant (steady turning), a fourth section (C to D) in which the curvature gradually decreases (the curvature monotonically decreases: the left-right acceleration is decreased), and a fifth section (from D) in which the curvature is 0 (straight).

Figure 16:
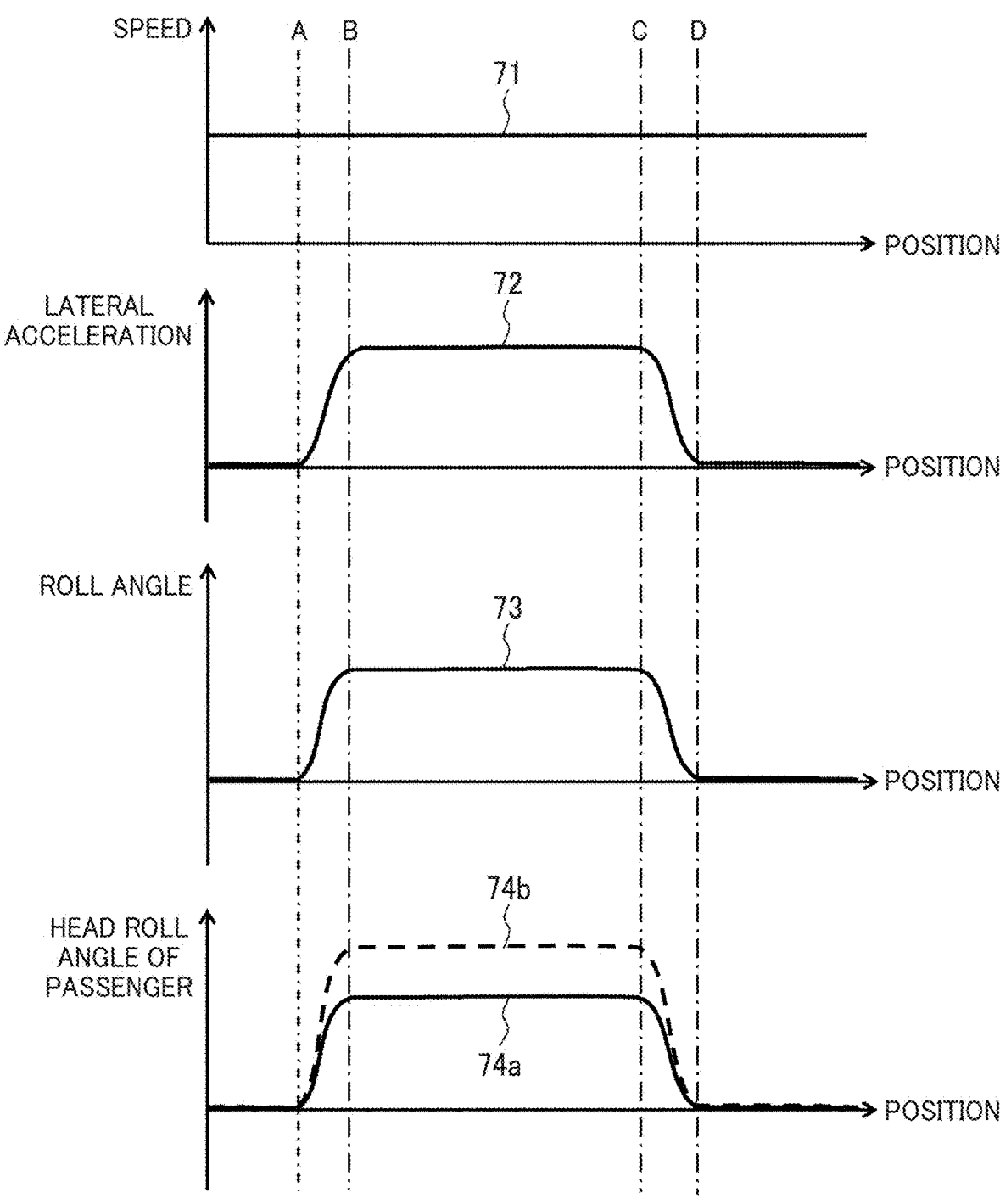
FIG. 16 is a diagram illustrating an example of the change in the vehicle motion caused by the vehicle motion generation unit 25 of the first embodiment.

FIG. 16 illustrates an example of the changes with time in the behavior of the vehicle 1 and the head roll angle 74 of the passenger when the target value 22 is generated so as to pass through the left curve like FIG. 15 at the constant speed. FIG. 16 illustrates, in order from the top, the changes in the speed 71, the lateral acceleration 72, and the roll angle 73 of the vehicle 1, and the head roll angle 74 of the passenger, and the horizontal axis indicates the moving distance from the position immediately before entering the curve. The dashed-and-dotted lines respectively correspond to the positions of the sections A-D illustrated in FIG. 15.

First, the speed 71 is always changed at the constant value since the case where the vehicle 1 passes at the constant speed. When the vehicle travels in such speed change, the lateral acceleration 72 caused in the vehicle 1 is increased while the curvature gradually increases in the second section (A to B), the lateral acceleration 72 is changed at the constant value in the third section (B to C) in which the curvature is constant (steady turning), and the lateral acceleration 72 is gradually decreased in the fourth section (C to D) in which the curvature gradually decreases. The roll angle 73 is also changed in almost the same manner as the lateral acceleration 72.

Note that the case where the vehicle 1 moves in the left direction with respect to the advancing direction, that is, the case where the vehicle 1 is turned in the left direction, is defined as positive, and the roll angle 73 calculated at this time is also positive (clockwise with respect to the advancing direction), that is, causes the roll in the outside (right) direction of the turning.

In such vehicle behavior, an example of the change in the head roll angle 74 of the passenger is illustrated like the lowest stage in FIG. 16. When the vehicle 1 enters the left curve, the head of the passenger 52 perceives inertial acceleration in the horizontal direction. In addition, the head is moved to the outside of the turning by the inertia, so that the head roll angle 74 is generated. At this time, even in the same vehicle behavior (the lateral acceleration and the roll angle), the movement of the head is different depending on passenger, or depending on the task in riding even in the same passenger. That is, the head roll angle of the passenger A whose head is unlikely to be moved is changed like the 74*a*, and the head roll angle of the passenger B whose head is likely to be moved is changed like the 74*b*. According to the principle of the MSI that is one of motion sickness sensitivity indexes 27, the latter passenger B is likely to cause the motion sickness.

Figure 17:
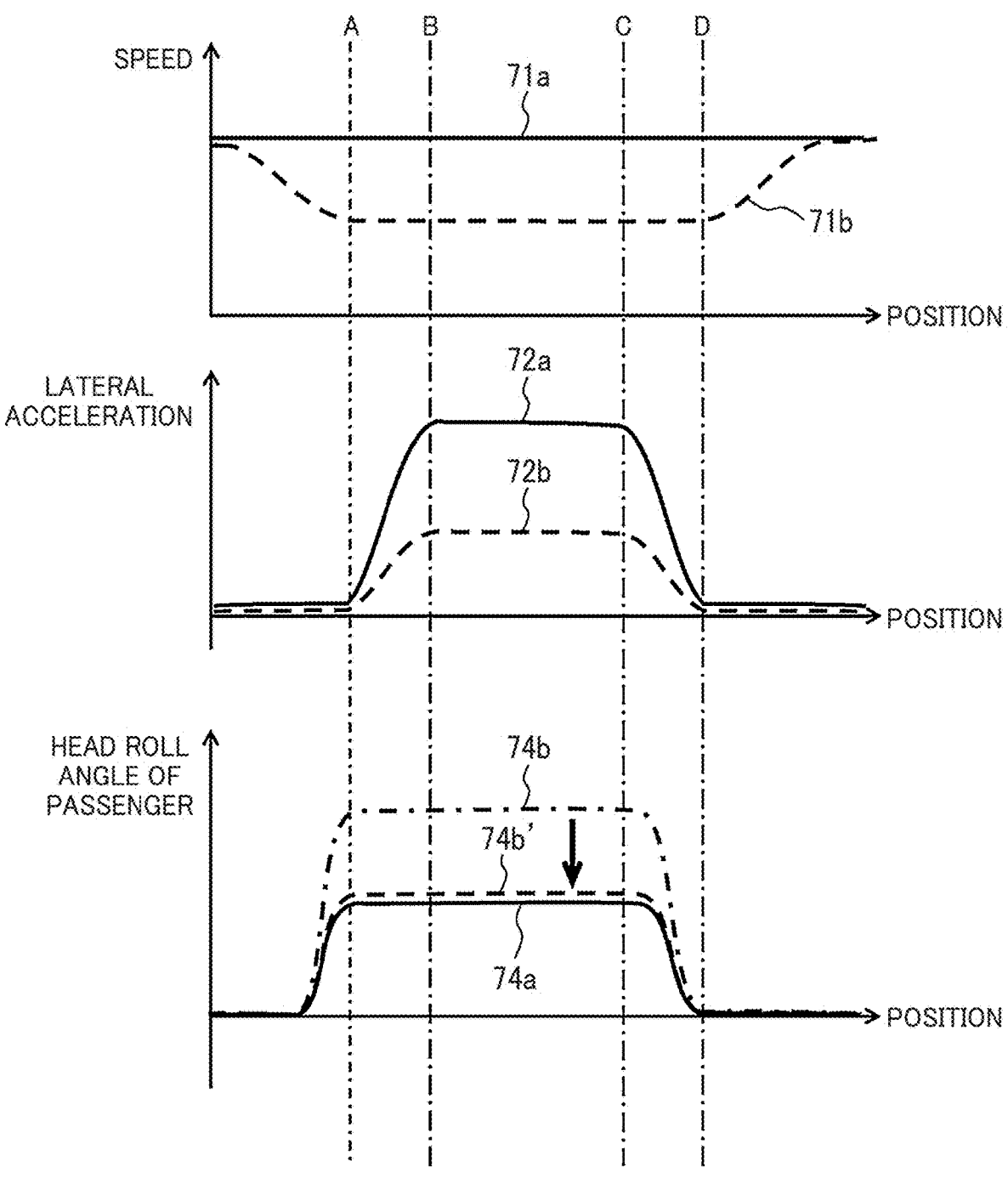
FIG. 17 is a diagram illustrating an example of the change in the vehicle motion caused by the vehicle motion generation unit 25 of the first embodiment.

FIG. 17 illustrates an example in which the speed 71 is changed as the vehicle motion 26. In order from the top, the changes in the speed 71 and the lateral acceleration 72 of the vehicle 1 and the head roll angle 74 of the passenger are represented, and the horizontal axis indicates the moving distance from the position immediately before the vehicle 1 enters the curve. The dashed-and-dotted lines respectively correspond to the positions of the sections A to D illustrated in FIG. 15.

The behavior with respect to the passenger A whose head is unlikely to be moved, that is, the behavior of a speed 71*a*, lateral acceleration 72*a*, and the head roll angle 74*a* of the passenger is the same as FIG. 16. On the contrary, when the vehicle 1 passes through the left curve at the same speed 71*a* while the passenger B whose head is likely to be moved is riding in the vehicle 1, the head roll angle becomes a higher value than the 74*a* like the 74*b*. Therefore, the vehicle motion generation unit 25 generates the vehicle motion 26 that reduces the speed like 71*b*.

Specifically, the front-rear acceleration (not illustrated) that is sufficiently decelerated before the vehicle 1 enters the curve is generated as the vehicle motion 26. With this, the lateral acceleration during the curve passing is reduced like 72*b*, and the head roll angle 74*b* becomes 74*b*' equal to the 74*a*. That is, by reducing the speed during the curve passing with respect to the passenger B having the high motion sickness sensitivity, the movement of the head caused by that is suppressed, thereby suppressing the motion sickness from being caused.

Figure 18:
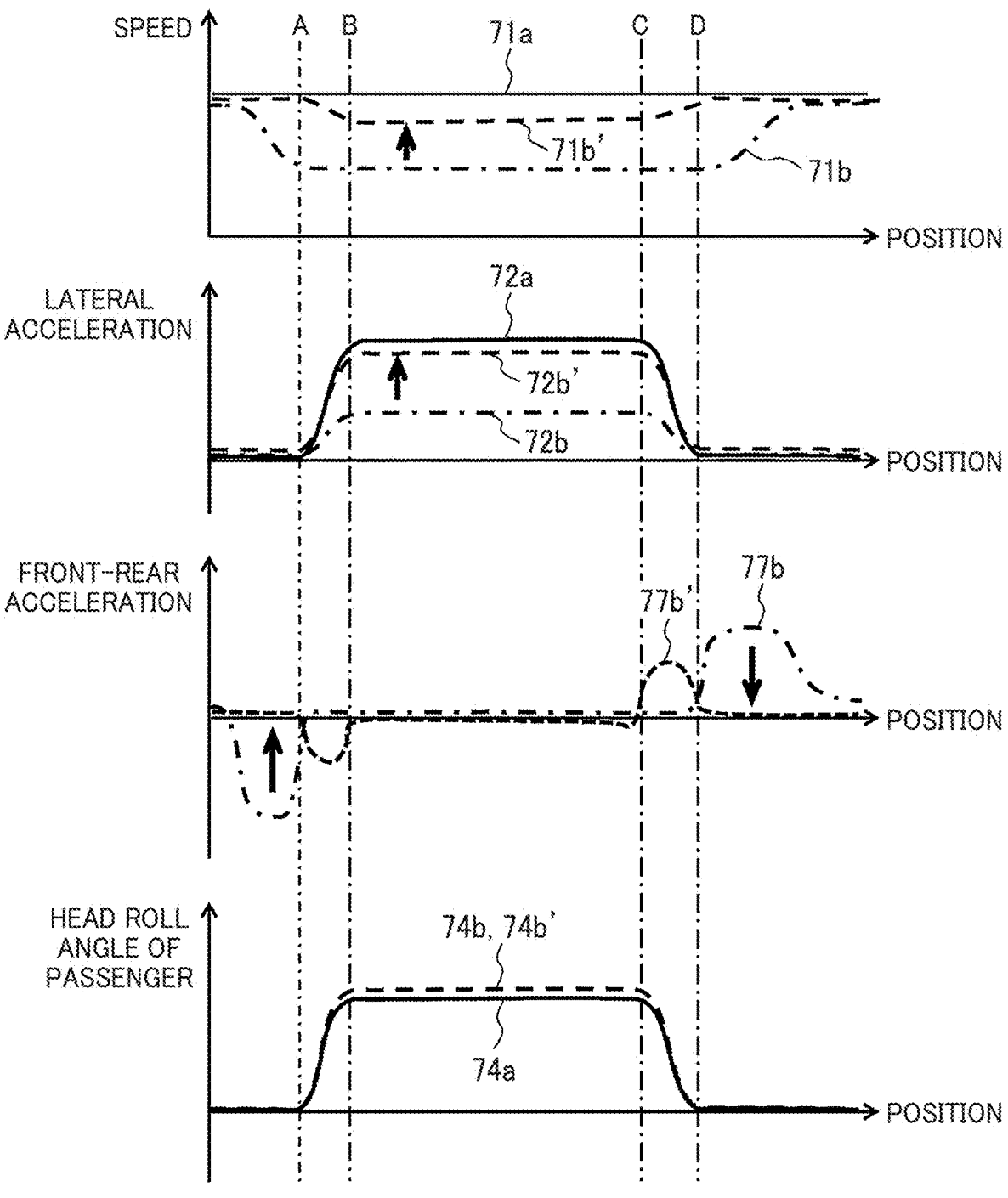
FIG. 18 is a diagram illustrating an example of the change in the vehicle motion caused by the vehicle motion generation unit 25 of the first embodiment.

FIG. 18 illustrates an example in which the front-rear acceleration proportional to the change with time in the lateral acceleration is generated as the vehicle motion 26, so that the head movement of the passenger B is reduced. In order from the top, the changes in the speed 71, the lateral acceleration 72, and the front-rear acceleration 77 of the vehicle 1, and the head roll angle 74 of the passenger are illustrated, and the horizontal axis indicates the moving distance from the position immediately before the vehicle 1 enters the curve. The dashed-and-dotted lines respectively correspond to the positions of the sections A to D illustrated in FIG. 15. The changes in the speed 71*a* and the lateral acceleration 72*a* with respect to the passenger A whose head is unlikely to be moved and the head roll angle 74*a* of the passenger are the same as FIG. 17, and the description thereof is omitted. In addition, the front-rear acceleration 77*a* with respect to the subject A is always 0 like FIG. 14, and the illustration thereof is omitted.

On the contrary, when the speed is reduced with respect to the passenger B whose head is likely to be moved, as indicated by the 71*b*, like FIG. 17, the lateral acceleration during the curve passing is reduced as indicated by the 72*b*, like FIG. 17, and for the head roll angle, the 74*b* is equal to the 74*a*. At this time, as indicated by the 77*b*, the front-rear acceleration is caused in the deceleration direction before the vehicle 1 enters the curve (before the A point), and is caused in the acceleration direction after the vehicle 1 exits the curve (after the D point).

On the other hand, in the present invention, the speed is changed as indicated by 71*b*'. That is, the speed is lowered in the A-B section during the gentle curve traveling, and the speed is kept constant in the B-C section in which the curvature is constant, and the speed is increased in the C-D section during the gentle curve traveling. At this time, as compared with the 71*b*, the passing speed as the 71*b*' is increased in the curve section (B-C section), and as a result, the lateral acceleration also becomes 72*b*' higher than the 72*b*. When front-rear acceleration 77*b*' is observed, the front-rear acceleration in the deceleration direction proportional to the increase of the lateral acceleration 72*b*' in the A-B section is caused, and the front-rear acceleration in the acceleration direction proportional to the decrease of the lateral acceleration 72*b*' in the C-D section is caused. By performing such behavior, for the head roll angle, the 74*b*' is equal to the 74*b* regardless of high curve passing speed.

The present embodiment has been described by taking the example in which to reduce the head roll angle 74 of the passenger, the front-rear acceleration 77 proportional to the change with time in the lateral acceleration 72 is caused, but in place of the front-rear acceleration 77, the same effect is assumed to be obtained also by causing the pitch angle in the forward tilt direction in the vehicle by the actuator such as the suspension 15. Therefore, the vehicle motion generation unit 25 may generate, as the vehicle motion 26, the pitch angle.

As described above, according to the vehicle control device 2 of the present embodiment, the vehicle motion 26 that notes the association between the front-rear direction and the horizontal direction is generated, so that the vehicle speed during the curve passing is suppressed from being lowered as compared with the conventional art, and while the convenience of immediately reaching the target place is held, the motion sickness incidence of the passenger is suppressed. By having the different head movement prediction model 28 depending on passenger, it is possible to provide the vehicle control device that responds to the individual differences regarding the motion sickness sensitivity of the passenger, and generates the vehicle motion target value that effectively reduces the motion sickness.

Note that in the description of the first embodiment, on the assumption that the autonomous driving is performed, the change in the motion amount in the path to the target place (target value generation) has been previously known, and the head movement prediction model 28 in FIG. 4 predicts the head movement at the future point of time, but FIG. 4 can also be achieved for the present point of time. FIG. 4 can also be achieved in the form of calculating the head movement in which the change in the motion amount at the present point of time gives the passenger for reflection on the control at the present point of time.

Second Embodiment

The vehicle control device and the vehicle integrated control method according to a second embodiment of the present invention will be described with reference to FIGS. 19 to 22.

Figure 3A:
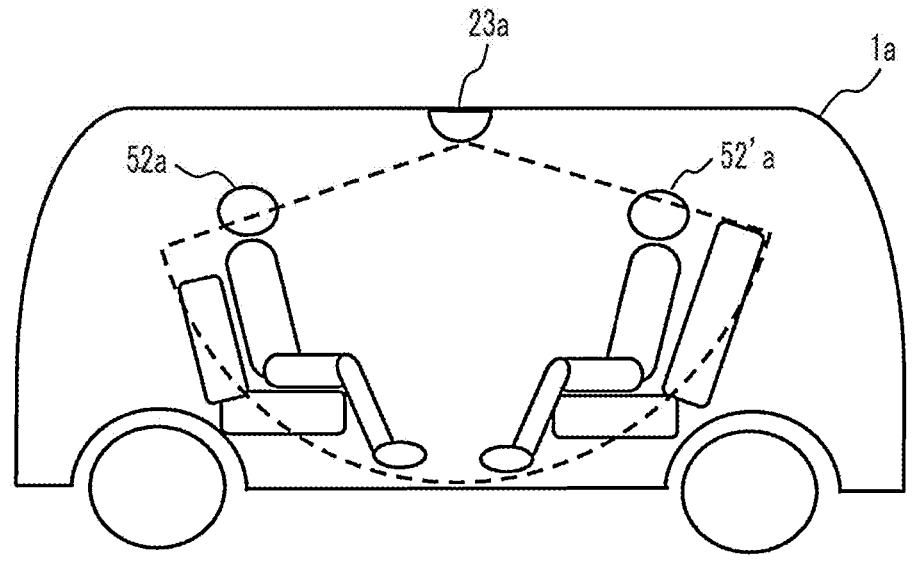
FIG. 3a is a diagram illustrating, as an example of a passenger characteristic acquiring unit, the case where the vehicle has the shape of a transit bus that can perform autonomous driving.

The first embodiment exemplifies the configuration in which the vehicle control device 2 has, in its interior, the head movement prediction model 28, and the parameter stored in its interior is different according to passenger. On the other hand, considering that the present invention is performed by the transit bus or the like of autonomous driving as illustrated in FIG. 3*a*, a large number of unspecified passengers (occupants) are assumed to ride the transit but or the like. In such a case, considering that the motion sickness of the passenger is reduced more effectively, the parameter is desirably learned for each passenger. For that, the head movement prediction model 28 may identify the parameter for each passenger.

Figure 19:
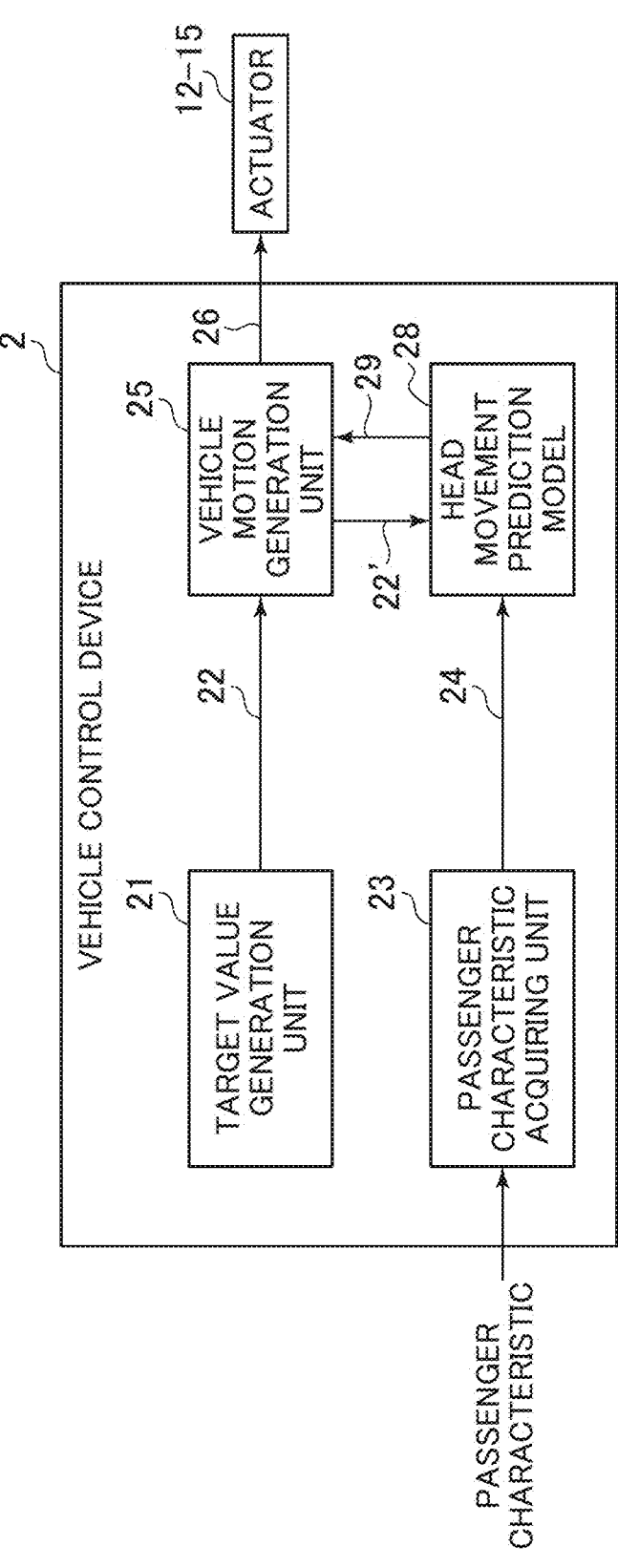
FIG. 19 is a function block diagram of the vehicle control device 2 according to a second embodiment of the present invention.
Figure 20:
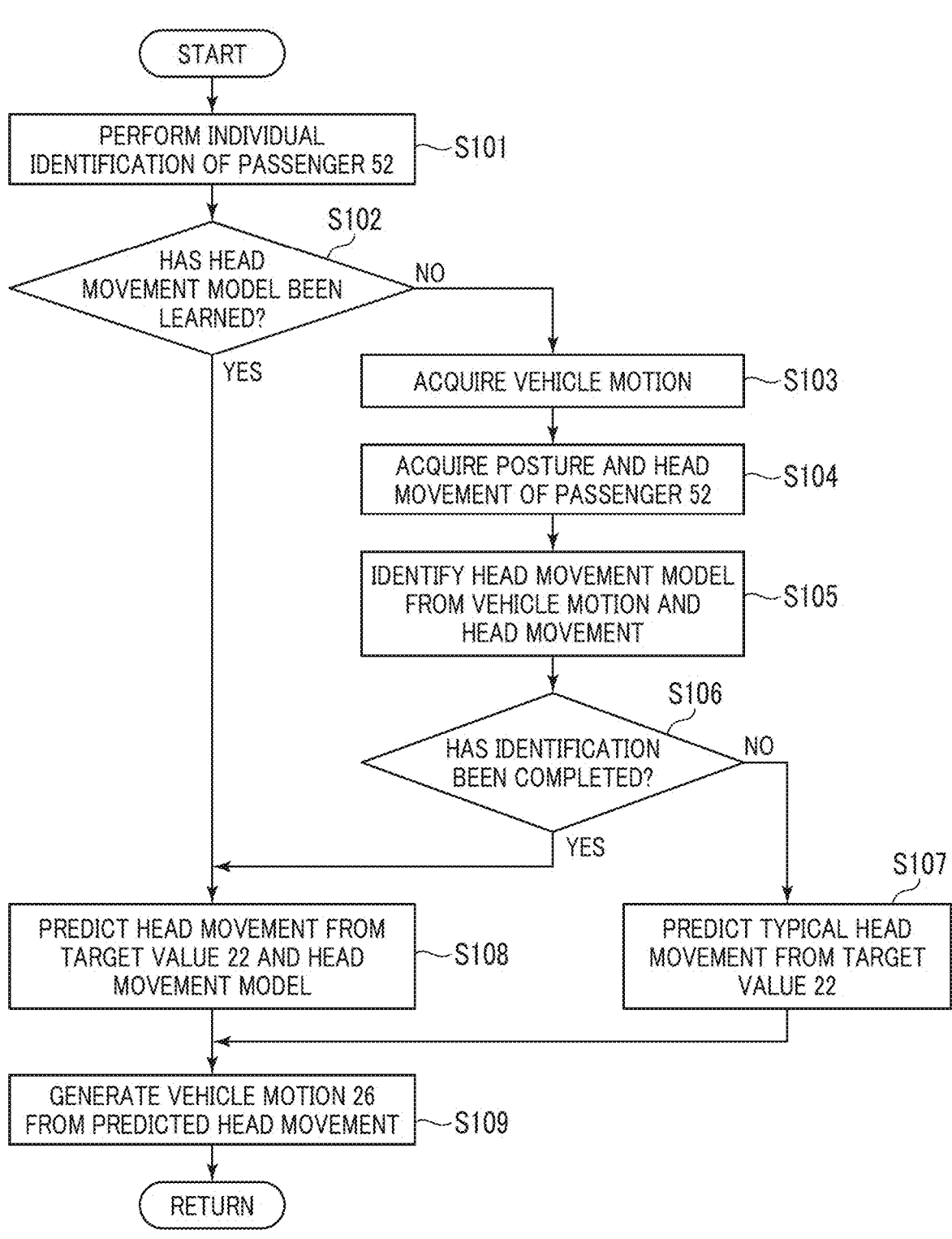
FIG. 20 is a flowchart illustrating the processes of the vehicle control device 2 of the second embodiment.

FIG. 19 is a function block diagram of the vehicle control device 2 of the second embodiment. As illustrated in FIG. 20, the vehicle control device 2 of the present embodiment is configured of at least the target value generation unit 21, the passenger characteristic acquiring unit 23, the vehicle motion generation unit 25, and the head movement prediction model 28. Since the target value generation unit 21 is the same as the first embodiment, the description thereof is omitted.

Figure 3B:
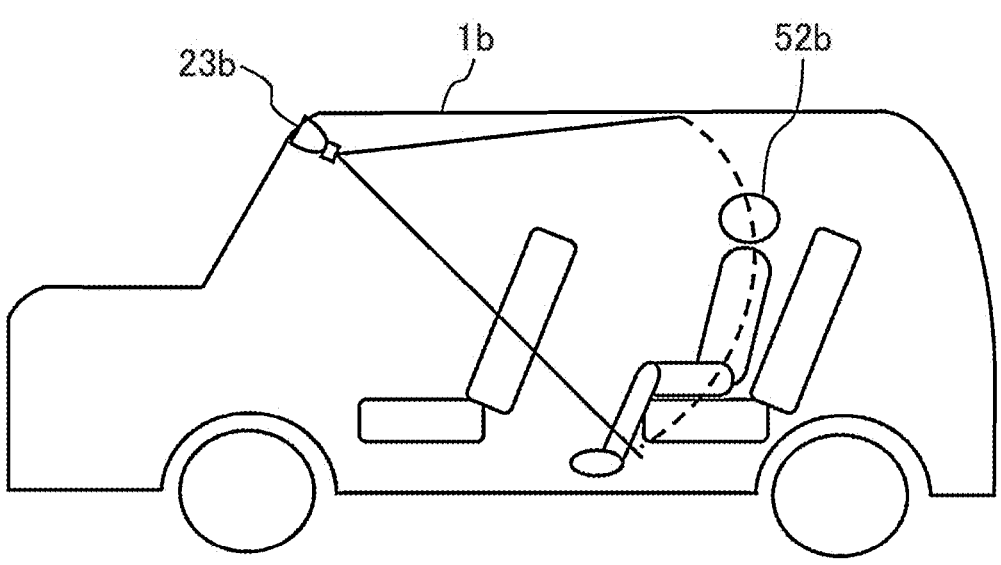
FIG. 3b is a diagram illustrating, as an example of the passenger characteristic acquiring unit, the case where the vehicle has the shape of an automobile that can perform autonomous driving.

As described in FIGS. 3*a* and 3*b*, the passenger characteristic acquiring unit 23 acquires the passenger characteristic 24 (the riding posture, the head posture, and the like of the passenger). For example, like FIGS. 3*a* and 3*b*, a camera is mounted as the passenger characteristic acquiring unit 23 in the vehicle compartment of the vehicle 1, and the movement of the head of the passenger is measured to estimate the causing susceptibility (sensitivity) of the motion sickness (carsickness). Alternatively, a mechanism that acquires information regarding the motion sickness (carsickness) sensitivity of the passenger during riding from the portable terminal that the passenger owns may be included.

As an example of the passenger characteristic 24, the motion amounts of up to 6 axes regarding the head of the passenger 52 riding the vehicle 1 are given. Here, in particular, at least one of the roll angle and the pitch angle of the head is required to be acquired. As an example of the acquiring method, for example, as illustrated in FIGS. 3*a* and 3*b*, the head image of the passenger 52 is imaged from the camera mounted in the vehicle compartment, and the roll angle or the pitch angle is recognized from the image. Note that when the passenger 52 actively moves his/her head, its motion amount is excluded to extract the head motion caused by the vehicle motion.

The vehicle motion generation unit 25 corrects the target value 22 of the type that has been inputted, generates the target value of the type that has not been inputted, and outputs the vehicle motion 26 including the motions and the postures of up to 6 degrees of freedom (front and rear, left and right, up and down, roll, pitch and yaw) of the vehicle. The point in that the vehicle motion 26 for reducing the head movement of the passenger is generated is the same as the first embodiment. In addition to that, the vehicle motion generation unit 25 of the present embodiment has a role of generating the vehicle motion 26' for the head movement prediction model 28 described later to learn the head movement feature of the passenger.

The head movement prediction model 28 has a physical model that receives the temporary or final vehicle motion 26' from the vehicle motion generation unit 25 and calculates, into the future, the prediction value of the head movement (the motion amounts and the posture angles of the 6 axes of the head of the passenger) that can be caused by the vehicle motion 26' for the passenger during riding.

Its function is the same as the first embodiment, but in addition to that, the head movement prediction model 28 of the present embodiment has a function of using the passenger characteristic 24 acquired from the passenger characteristic acquiring unit 23 and the vehicle motion 26' to adapt the parameter of the head movement model to the passenger during riding at present.

Note that the head movement prediction model 28 may use, as the vehicle motion 26', the vehicle motion including up to 6 axes (the respective detection values of the respective front-rear, left-right, and up-down accelerations and the respective roll, pitch, and yaw rates) acquired from the combine sensor 4. The combine sensor 4 mounted on the typical vehicle 1 typically acquires a total of 3 axes of the respective front-rear and left-right accelerations and the yaw rate. In this case, the rates or the angles of the roll and the pitch may be estimated by acquiring the vehicle motion including these 3 axes, the speed 71, and the steering angle from the steering mechanism 14.

FIG. 20 is a flowchart illustrating the process of the vehicle control device 2 of the present embodiment. In this process, it is judged, for each calculation step, whether or not the identification of the parameter of the head movement model has been completed with respect to the passenger 52 riding in the vehicle 1, and when the identification has not been completed, the head movement of the passenger is predicted by the typical coefficient while the identification is performed, and when the identification has been completed, the head movement of the passenger is predicted by the identified coefficient.

First, in step S101, the passenger characteristic acquiring unit 23 performs the individual identification of the passenger 52. For example, from the camera image, it is judged whether or not the passenger 52 has ridden the vehicle 1 in the past.

Next, in step S102, it is judged whether or not the head movement prediction model 28 has learned the head movement model regarding the passenger 52. That is, it is judged whether or not the spring coefficient and the damper coefficient of the passenger 52 are stored in the head movement prediction model 28.

When the head movement model of the passenger 52 has not been learned (No), in step S103, the head movement prediction model 28 acquires the vehicle motion 26'. Further, in step S104, the passenger characteristic acquiring unit 23 acquires the head movement of the passenger 52. Then, in step S105, the head movement prediction model 28 identifies the head movement model parameter of the passenger 52 on the basis of the acquired vehicle motion 26' and head movement of the passenger 52. Thereafter, in step S106, it is judged whether or not the identification has been completed. Here, the identification requires the time series information of the vehicle motion and the head movement of the passenger 52 for a predetermined time. Therefore, whether or not the predetermined time has elapsed from the start of the learning becomes a main judgment criterion.

In step S106, it is judged that the identification has not been completed (No), in step S107, the head movement prediction model 28 uses the spring coefficient and the damper coefficient of a typical human body to predict the head movement of the passenger 52. At this time, the vehicle motion generation unit 25 generates the special vehicle motion 26' necessary for the learning, as needed. The detail thereof will be described later.

On the other hand, in step S102, when the head movement model of the passenger 52 has been learned (Yes), or in step S106, when it is judged that the identification has been completed (Yes), the identified spring coefficient and damper coefficient are used to predict the head movement of the passenger 52 in step S108.

Then, in step S109, the vehicle motion generation unit 25 calculates the vehicle motion 26 on the basis of the identified head movement model parameter of the passenger 52.

In the above series of processes illustrated in FIG. 20, a plurality of passengers are assumed to be present. For example, the passenger A uses the vehicle 1 at all times, and therefore, the head learning model of the passenger A has been formed, and the passengers B and C have not used the vehicle 1, but learning about the passenger B can be immediately done for a short time, whereas learning about the passenger C cannot be done for a short time, and is thus estimated by a model for handling the passenger C as a typical person. According to this example, it is apparent that the suitable head movement prediction model is formed for each passenger, and the driving in the form of reflecting the individual differences is achieved.

Figure 21:
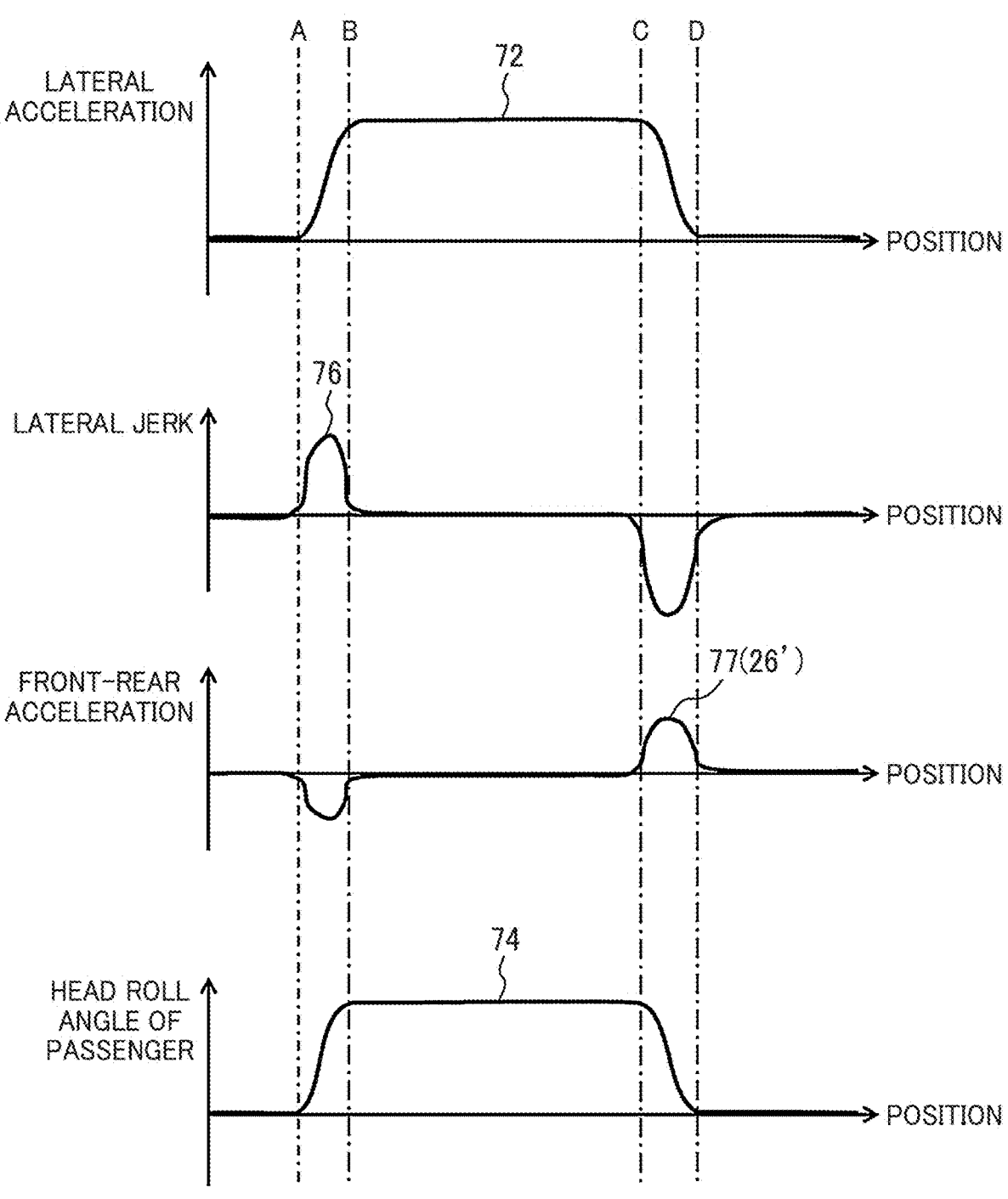
FIG. 21 is a diagram illustrating an example of the change in the vehicle motion caused by the vehicle motion generation unit 25 of the second embodiment.

An example in which the vehicle motion generation unit 25 generates the vehicle motion 26' for the learning in the head movement prediction model 28 will be described with reference to FIG. 21. Like FIG. 16, FIG. 21 illustrates an example of the changes with time in the vehicle motion 26' generated by the vehicle motion generation unit 25, the behavior of the vehicle 1, and the head roll angle 74 of the passenger when the vehicle 1 is assumed to pass through the left curve illustrated in FIG. 15 at the constant speed. FIG. 21 illustrates, in order from the top, the changes in the lateral acceleration 72, the lateral jerk 76, and the front-rear acceleration 77 (vehicle motion 26') of the vehicle 1, and the head roll angle 74 of the passenger, and the horizontal axis indicates the moving distance from the position immediately before the vehicle 1 enters the curve. The dashed-and-dotted lines respectively correspond to the positions of the sections A to D illustrated in FIG. 15.

In FIG. 21, the change in the lateral acceleration 72 is the same as FIG. 16. At this time, the lateral jerk that is the time derivative of the lateral acceleration 72 is changed like the 76. When the head movement prediction model 28 has not performed the learning yet, the vehicle motion generation unit 25 generates, as the vehicle motion 26', the front-rear acceleration 77 illustrated in FIG. 21. Like the vehicle motion feature of the GVC described with reference to FIG. 8, this is the front-rear acceleration proportional to the absolute value of the lateral jerk 76. Setting the GVC gain 66 that is the proportional coefficient to the optimum value according to passenger is the feature of the present invention, but here, since the head movement prediction model 28 has not started the learning, the GVC gain 66 is set to an initial value.

Various methods of setting the initial value are applicable. For example, as an example, when the learning results of the head movement models with respect to a large number of passengers are held as a database, the GVC gain 66 adapted to the passenger who is most likely to cause the head movement is set as the initial value. Alternatively, as a selection, for example, the GVC gain 66 is set to the average value of the GVC gains 66 adapted to the respective passengers, or alternatively, the GVC gain 66 is set to the maximum value. To perform the learning of the head movement model more effectively, it is typically desirable to set the GVC gain 66 to be large. In addition, when the learning cannot be performed due to some reason, for example, when the passenger characteristic 24 cannot be acquired, or when the passenger characteristic acquiring unit 23 is not present and there is no means for the individual identification of the passenger, the GVC gain 66 is continued to be set to the initial value.

By acquiring the changes with time in the lateral acceleration 72, the front-rear acceleration 77, and the head roll angle 74 of the passenger in FIG. 21, the head movement prediction model 28 identifies the physical parameter. Specifically, the respective parameters of K, C, and L expressed in Equation 2 and the features of the change in the K, C, and L by the front-rear acceleration illustrated in FIG. 12 are identified. For example, as illustrated in FIG. 7, for the passenger in which the amplitude of the head roll angle 74 is exhibited to be smaller with respect to the lateral acceleration 72, the parameter is likely to be identified as a larger value. In addition, for the passenger in which as the GVC gain is larger, the amplitude of the head roll angle 74 becomes smaller, the feature of the change in the K, C, and L by the front-rear acceleration is likely to be identified as the continuously increasing characteristic.

Figure 22:
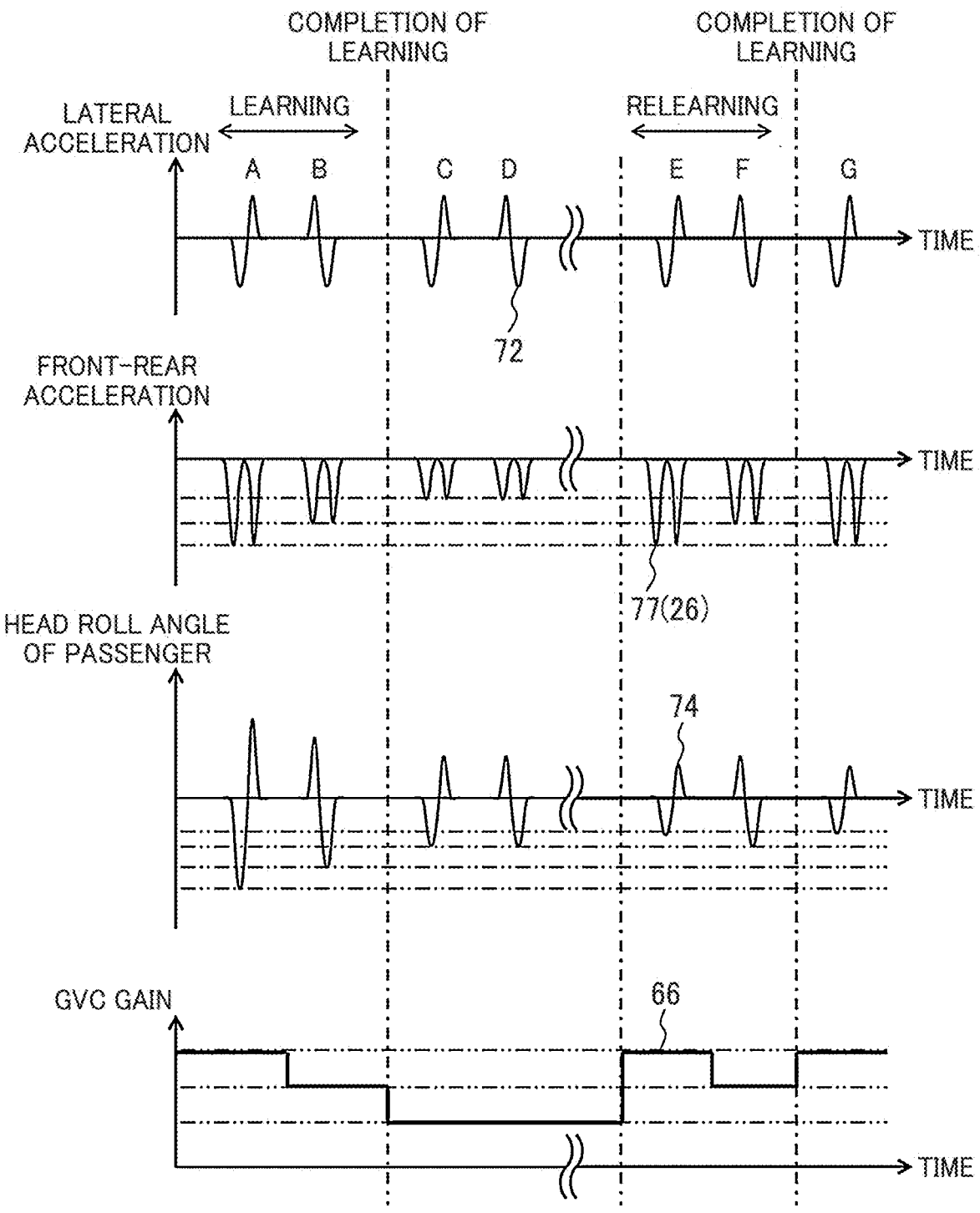
FIG. 22 is a diagram illustrating an example of the change in the vehicle motion caused by the vehicle motion generation unit 25 of the second embodiment.

An example of the change in the GVC gain 66 by the learning when the initial value of the GVC gain 66 is set to the maximum value of the GVC gain 66 adapted to each passenger will be described with reference to FIG. 22. FIG. 22 illustrates an example of the changes with time in the vehicle motion 26 generated by the vehicle motion generation unit 25, the behavior of the vehicle 1, and the head roll angle 74 of the passenger when the lane change as illustrated in FIG. 7 is repeatedly caused on a straight road like a freeway. FIG. 22 illustrates, in order from the top, the changes in the lateral acceleration 72 and the front-rear acceleration 77 (vehicle motion 26) of the vehicle 1, the head roll angle 74 of the passenger, and the GVC gain 66, and the horizontal axis is the elapse distance from the point of time at which the head movement model 28 starts the learning with respect to the passenger during riding. Here, the lane change is repeatedly caused, and for convenience in description, each time the lane change is caused, the reference numerals A to G are indicated in order from the left. The amplitude and the cycle of the lateral acceleration 72 are the same every time for each lane change. Note that a long-time elapse is assumed between the lane changes D and E, and the lane change is assumed to be caused a plurality of times also between the lane changes D and E. In addition, the lane change may be caused a plurality of times also between the respective reference numerals, and in that case, each change with time between the reference numerals repeats the same change as the change with time of the reference numeral positioned on the left side thereof, or performs the change with time so as to complement the change with time between both of the reference numerals.

First, at the point of time of the lane change A, the head movement prediction model 28 has just started the learning, and the GVC gain 66 in the vehicle motion generation unit 25 is set, as the initial value, to the maximum value of the gain adaptable to each passenger. At this time, the front-rear acceleration has the maximum magnitude in the negative direction with respect to the amplitude of the lateral acceleration 72. Then, the head roll angle of the passenger is generated like the 74 at the same time.

Next, at the point of time of the lane change B, for the learning of the head movement prediction model 28, the vehicle motion generation unit 25 decreases the GVC gain 66 by one step. As a result, the magnitude of the front-rear acceleration in the negative direction is also decreased by one step. At this time, when as illustrated, the amplitude of the head roll angle of the passenger is smaller as compared with the point of time of the lane change A, the head movement prediction model 28 identifies the respective parameters of K, C, and L, and identifies the K, C, and L as the characteristic in which the feature of the change in the K, C, and L by the front-rear acceleration is close to the horizontal (the feature of the change in the K, C, and L is not continuously increased much). As a result, in the lane changes C and D after the learning is completed, the GVC gain 66 is further decreased by one step, and the front-rear acceleration is not also caused much. Thereafter, the GVC gain 66 is maintained for the predetermined time as the parameter adapted to the passenger.

On the other hand, when the passenger continues to ride the vehicle 1 for a certain time, the exhibition form of the movement of the head can be changed with time by grasping the feature of the behavior of the vehicle. This event is generated because, for example, the passenger becomes accustomed to long-time riding to lower the motion sickness sensitivity of the passenger, and the passenger grasps the features of the front-rear and left-right motions to perform, more easily, the active movement such as to suppress the movement of the head when the front-rear acceleration is caused. Accordingly, after the elapse of the predetermined time, the head movement prediction model 28 may execute the process of relearning.

After the lane change E in FIG. 22, the behavior of the relearning is illustrated. First, at the point of time of the lane change E, the GVC gain 66 in the vehicle motion generation unit 25 is set, as the initial value, to the maximum value of the gain adaptable to each passenger again. At this time, the front-rear acceleration 77 has the maximum magnitude in the negative direction with respect to the amplitude of the lateral acceleration 72. Then, the head roll angle of the passenger is caused like the 74 at the same time.

Next, at the point of time of the lane change F, for the learning of the head movement prediction model 28, the vehicle motion generation unit 25 decreases the GVC gain 66 by one step. As a result, the magnitude of the front-rear acceleration in the negative direction is also decreased by one step. At this time, as illustrated, when the amplitude of the head roll angle of the passenger becomes larger as compared with the point of time of the lane change E (the opposite change of the point of time of the lane change B), the head movement prediction model 28 identifies the respective parameters of K, C, and L, and identifies, as the continuously increasing characteristic, the feature of the change in the K, C, and L by the front-rear acceleration. As a result, in the lane change G after the learning is completed, the GVC gain 66 is increased again to actively generate the front-rear acceleration. Thereafter, the GVC gain is maintained for the predetermined time as the parameter adapted to the passenger.

In this way, when the passenger whose head movement feature has not been determined yet newly rides the vehicle 1, the particular vehicle motion necessary for the learning is caused, and the head movement prediction model 28 can learn the head movement feature of the passenger from the relationship between the lateral acceleration 72, the front-rear acceleration 77, and the head roll angle 74 of the passenger at that time.

As described above, according to the vehicle control device 2 of the present embodiment, how the head movements of a large number of unspecified passengers 52 are caused is predicted including the individual differences, and the vehicle motion is changed, so that the motion sicknesses of the passengers 52 can be reduced more effectively.

Third Embodiment

The vehicle control device and the vehicle integrated control method according to a third embodiment of the present invention will be described with reference to FIGS. 23, 24a, and 24b.

In the first and second embodiments, the vehicle control device 2 outputs the vehicle motion 26, and decides the operation amount of each of the actuators 12 to 15 or the subordinate controller on the basis of the vehicle motion 26, but in the case of the manually operated vehicle in which the actuator that can receive the control instruction is insufficient, a driver 53 may be assisted such that the driver 53 achieves, by the manual operation, the vehicle motion equal to the vehicle motion 26 described in the first and second embodiments, in place of the vehicle motion 26.

Figure 23:
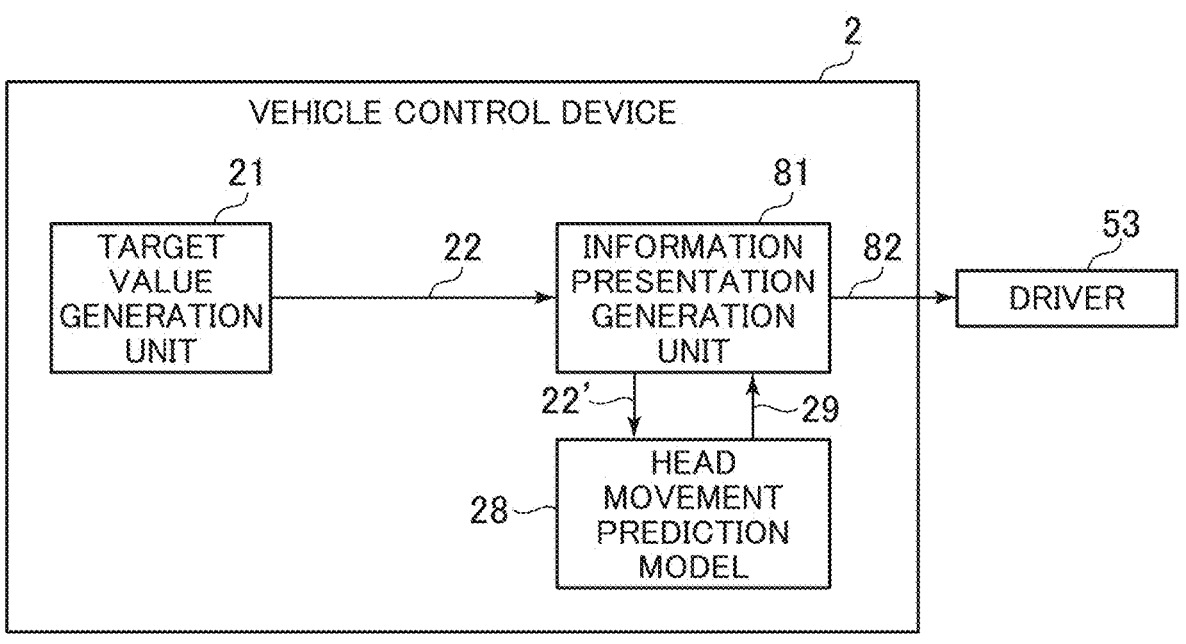
FIG. 23 is a function block diagram of the vehicle control device 2 of a third embodiment.
Figure 24A:
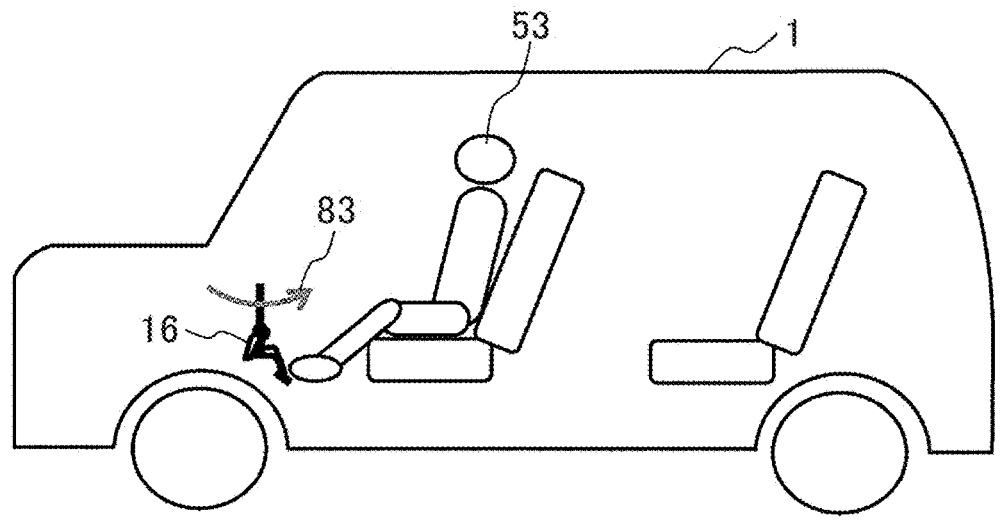
FIG. 24a is a diagram illustrating an example of an information presentation method and behavior.

FIG. 23 is a function block diagram of the vehicle control device 2 of the third embodiment. As illustrated in FIG. 23, the vehicle control device 2 of the present embodiment is configured of at least the target value generation unit 21, an information presentation generation unit 81, and the head movement prediction model 28. Since the target value generation unit 21 and the head movement prediction model 28 are the same as the first and second embodiments, the description thereof is omitted.

The information presentation generation unit 81 presents information that promotes the driver to generate the vehicle motion that takes into consideration the improvement of the ride comfort and the motion sickness reduction. The target of the vehicle motion such as to optimize the motion sickness sensitivity index 27 is generated on the basis of the head movement feature 29 of the passenger calculated by the head movement prediction model 28 like the first and second embodiments, and the information is presented to the driver so as to promote the driving movement according to the target.

An example of an information presentation method and behavior will be described with reference to FIGS. 24a and 24b. FIG. 24a is a schematic diagram illustrating a state where, by assuming, as the vehicle 1, an automobile that is manually operated, the driver 53 depresses the accelerator pedal 16 to control the acceleration or deceleration of the vehicle 1. At this time, an example of the information presentation method is that a reaction force (a force against the depression force of the driver) is actively generated with respect to the accelerator pedal 16.

Figure 24B:
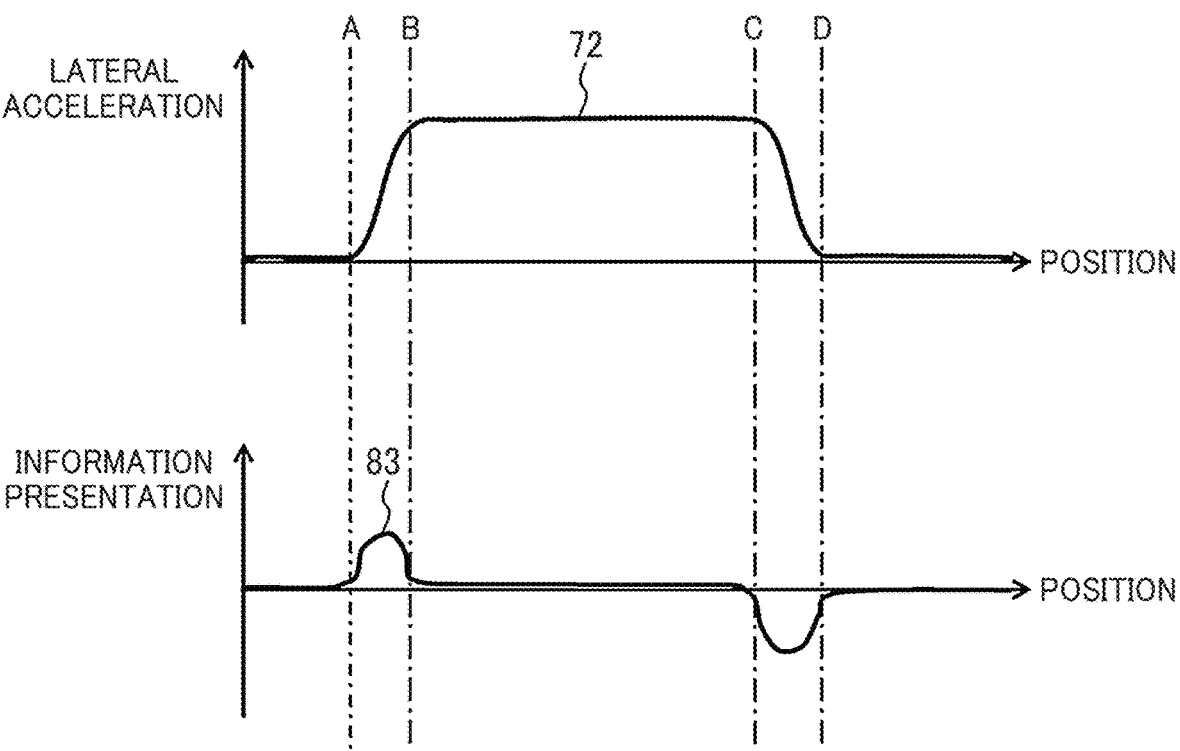
FIG. 24b is a diagram illustrating an example of the information presentation method and the behavior.

FIG. 24b illustrates an example of the behavior. This drawing illustrates the case where the vehicle 1 travels by the same vehicle behavior as FIG. 16 through the left curve illustrated in FIG. 15. The behavior of the lateral acceleration 72 is the same as FIG. 16. At this time, the change with time in the reaction force with respect to the accelerator pedal 16 is used, as information presentation 83, and the force against the depression force of the driver is taken and plotted in the positive direction, which is illustrated in the lower diagram of FIG. 24b. That is, like the GVC, the reaction force is caused in the positive direction between the A and B points during the traveling through the gentle curve. With this, the accelerator off by the driver is promoted, and the front-rear acceleration by the engine brake is promoted to be caused. On the contrary, the reaction force is decreased (or is caused in the negative direction) between the C and D points, and the front-rear acceleration is promoted to be caused. However, promoting the acceleration to the driver may involve a risk according to the road situation, so that this information presentation may be performed so as to be caused only on the deceleration side (between the A and B points).

Note that the example in which the reaction force with respect to the accelerator pedal 16 is changed has been described here, but the present embodiment is also applicable to the information presentation method other than this. For example, the reaction force against the brake pedal may be changed. In this case, the reaction force is decreased (or increased in the negative direction) between the A and B points during the traveling through the gentle curve, so that the braking can be promoted. Other than that, presentation by voice and the like are enabled.

As described above, according to the vehicle control device 2 of the present embodiment, also in the manually operated vehicle in which the actuator that can receive the control instruction is insufficient, it is possible to assist the driver such that the vehicle motion that exhibits the effects described in the first and second embodiments is generated by the driver.

For the first to third embodiments, the case where one passenger rides the vehicle 1 has been described above, but when a plurality of passengers are present in the vehicle compartment of the same vehicle 1, while the vehicle motion that is effective with respect to the person who is likely to cause the motion sickness is achieved, the vehicle motion is required to be generated by paying attention so that the person who is unlikely to cause the motion sickness does not cause the motion sickness. For example, when the passengers A and B illustrated in FIG. 12b ride the vehicle 1 at the same time (the situation like FIG. 3a), the roll rigidity (spring constant K) of the head of the passenger A is, on the contrary, decreased due to the causing of the front-rear acceleration, so that as the result of performing the vehicle motion, as an example, the GVC gain is decided such that the head movements (the amplitudes of the roll angles) of both become almost the same.

For the first to third embodiments, the case where the passenger rides the vehicle so as to face in the front direction has been described above, but the passenger may ride the vehicle so as to face in the rear direction like FIG. 3a, or may ride the vehicle so as to face in the side direction. In particular, when the passenger faces in the side direction, the head movement in the front-rear (pitch) direction for the passenger and the motion in the horizontal (roll) direction of the vehicle may also be associated with each other. Therefore, the present invention is effective, not only with respect to the association between the head movement in the horizontal direction of the passenger and the vehicle motion in the front-rear direction, but also with respect to other combinations of the head movement in the front-rear direction of the passenger, the vehicle motion in the horizontal direction, and the like.

It should be noted that the present invention is not limited to the embodiments described above, and includes various modifications. For example, the embodiments described above have been described in detail to simply describe the present invention, and are not necessarily required to include all the described configurations. In addition, part of the configuration of one embodiment can be replaced with the configurations of other embodiments, and in addition, the configuration of the one embodiment can also be added with the configurations of other embodiments. In addition, part of the configuration of each of the embodiments can be subjected to addition, deletion, and replacement with respect to other configurations.

LIST OF REFERENCE SIGNS

1: vehicle
11: wheel
12: motor
13: brake mechanism
13a: wheel cylinder
13b: brake control device

26

14: steering mechanism
14a: steering control device
14b: steering motor
15: suspension
16: accelerator pedal
16a: stroke sensor
16b: acceleration control device
17: brake pedal
18: steering wheel
18a: steering torque detection device
18b: steering angle detection device
18d: steering motor
19: external environment sensor
2: vehicle control device
21: target value generation unit
22: target value
23: passenger characteristic acquiring unit
24: passenger characteristic
25: vehicle motion generation unit
26: vehicle motion
27: motion sickness sensitivity index
28: head movement prediction model
29: head movement feature
3: outside control device
4: combine sensor
51: seat
52: passenger
53: driver
61: spring in head movement model
62: damping in head movement model
63: inertia in head movement model
64: displacement of inertia in head movement model
65: spring coefficient K in head movement model
66: GVC gain
71: speed
72: lateral acceleration
73: roll angle
74: head roll angle of passenger
75: traveling orbit
76: lateral jerk
77: front-rear acceleration
78: head roll rate of passenger
79: Lissajous waveform (roll rate of vehicle and head roll rate of passenger)
81: information presentation generation unit
82: information presentation

The invention claimed is:

1. A vehicle control device comprising:

a head movement prediction model that finds, relative to a head movement of a passenger in a left-right or roll direction caused by vehicle motion in the left-right or roll direction, a change in the head movement of the passenger in the left-right or roll direction caused by the vehicle motion in a front-rear or pitch direction different from the left-right or roll direction; and a vehicle motion generation unit that generates the vehicle motion in the front-rear or pitch direction to reduce the head movement in the left-right or roll direction on the basis of the head movement prediction model;

wherein the head movement prediction model is a dynamic model of a spring-mass-damper having parameters different for each passenger; and wherein the vehicle motion generation unit generates the vehicle motion in the front-rear or pitch direction to suppress a motion sickness susceptibility index calculated from an output of the dynamic model.

2. The vehicle control device according to claim 1, wherein a head movement characteristic learning unit is provided in the head movement prediction model, the head movement characteristic learning unit learning a characteristic of the head movement of each passenger corresponding to the vehicle motion.

3. The vehicle control device according to claim 2, wherein the head movement characteristic learning unit learns the characteristic of the head movement of the passenger on the basis of a head posture acquired when a predetermined vehicle motion is generated.

4. The vehicle control device according to claim 3, wherein the vehicle motion generation unit generates, as the predetermined vehicle motion in the head movement characteristic learning unit, the vehicle motion in which at least one of the front-rear direction or pitch direction and the left-right or roll direction of the vehicle are combined.

5. The vehicle control device according to claim 2, wherein the head movement characteristic learning unit identifies each riding posture pattern expected to be adopted by the passenger, and learns the characteristic of the head movement of the passenger corresponding to the vehicle motion.

6. The vehicle control device according to claim 2, wherein the head movement characteristic learning unit sets a predetermined parameter before the learning, and corrects the predetermined parameter by the learning for each passenger.

7. The vehicle control device according to claim 6, wherein a large parameter value is set as the predetermined parameter, and by the learning, the large parameter value is corrected in the direction in which the parameter value becomes smaller.

8. The vehicle control device according to claim 7, wherein after the large parameter value is set as the predetermined parameter, and by the learning, the large parameter value is corrected in the direction in which the parameter value becomes smaller to complete the learning, the corrected parameter value is corrected again in the direction in which the parameter value becomes larger.

9. The vehicle control device according to claim 6, wherein as the predetermined parameter, an average value of the parameters that are statistically acquired is set.

10. The vehicle control device according to claim 6, wherein after the predetermined parameter is corrected to complete the learning, and the vehicle travels for elapse of a predetermined time on the basis of the corrected parameter, the corrected parameter is corrected again.

11. The vehicle control device according to claim 1, wherein a display device that promotes the vehicle motion in the front-rear or pitch direction to a driver is provided.

* * * * *